(12) United States Patent
Choi et al.

(10) Patent No.: US 9,313,315 B2
(45) Date of Patent: Apr. 12, 2016

(54) MOBILE TERMINAL AND METHOD OF CONTROLLING THE SAME FOR TAGGING DIFFERENT NFC TAGS

(75) Inventors: Eunkyung Choi, Seoul (KR); Nayeoung Kim, Seoul (KR); Jungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 231 days.

(21) Appl. No.: 13/546,593

(22) Filed: Jul. 11, 2012

(65) Prior Publication Data

US 2013/0023258 A1 Jan. 24, 2013

(30) Foreign Application Priority Data

Jul. 20, 2011 (KR) .................. 10-2011-0071816

(51) Int. Cl.
*H04B 5/00* (2006.01)
*H04M 1/725* (2006.01)

(52) U.S. Cl.
CPC ........ *H04M 1/7253* (2013.01); *H04M 1/72569* (2013.01); *H04M 2250/04* (2013.01)

(58) Field of Classification Search
CPC .......... H04M 1/7253; H04M 1/72569; H04M 2250/04
See application file for complete search history.

(56) References Cited

U.S. PATENT DOCUMENTS

| | | | |
|---|---|---|---|
| 2005/0170849 A1* | 8/2005 | McClelland | 455/456.4 |
| 2008/0057876 A1* | 3/2008 | Hsia et al. | 455/69 |
| 2008/0152376 A1* | 6/2008 | Ananthesh | H04N 1/00 399/81 |
| 2008/0174405 A1 | 7/2008 | Toorn | |
| 2010/0099354 A1* | 4/2010 | Johnson | 455/41.1 |
| 2011/0070834 A1* | 3/2011 | Griffin | G06K 7/0008 455/41.1 |
| 2011/0165859 A1* | 7/2011 | Wengrovitz | 455/411 |
| 2012/0258662 A1 | 10/2012 | Takayama et al. | |

FOREIGN PATENT DOCUMENTS

| | | |
|---|---|---|
| CN | 1802835 A | 7/2006 |
| CN | 101790183 A | 7/2010 |
| WO | WO 2010/047849 A1 | 4/2010 |

* cited by examiner

*Primary Examiner* — Keith Fang
(74) *Attorney, Agent, or Firm* — Birch, Stewart, Kolasch & Birch, LLP

(57) ABSTRACT

Disclosed are a mobile terminal and a method of controlling the same. The mobile terminal according to the present invention includes a Near Field Communication (NFC) module and a controller configured to set up a first communication link with at least one first terminal, placed within a specific distance, by using the NFC module, activate a first operation mode based on data obtained through the first communication link, and execute at least one function included in the activated first operation mode. In accordance with the present invention, the mobile terminal can be easily set so that it is operated in a specific operation mode based on data obtained through a communication link using the NFC module.

16 Claims, 35 Drawing Sheets

MOBILE TERMINAL AND METHOD OF CONTROLLING THE SAME FOR TAGGING DIFFERENT NFC TAGS

CROSS-REFERENCE TO RELATED APPLICATIONS

Pursuant to 35 U.S.C. §119(a), this application claims the benefit of earlier filing date and right of priority to Korean Patent Application No. 10-2011-0071816, filed on Jul. 20, 2011, the contents of which are incorporated by reference herein in their entirety.

TECHNICAL FIELD

The present invention relates to a mobile terminal and a method of controlling the same and, more particularly, to a mobile terminal which can be easily set so that it is operated in a specific operation mode on the basis of data obtained through a communication link using an NFC module and a method of controlling the same.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

There is a recent tendency for various terminals including mobile terminals to have complex menu structures as mixed and various functions are provided. Furthermore, a function of displaying various digital documents including web pages is being added to the mobile terminal.

SUMMARY

The present invention relates to a mobile terminal which can be easily set so that it is operated in a specific operation mode on the basis of data obtained through a communication link using an NFC module and a method of controlling the same.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIGS. 17 to 20 are diagrams showing other embodiments in which a setting value for a specific operation mode in FIG. 8 is stored;

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
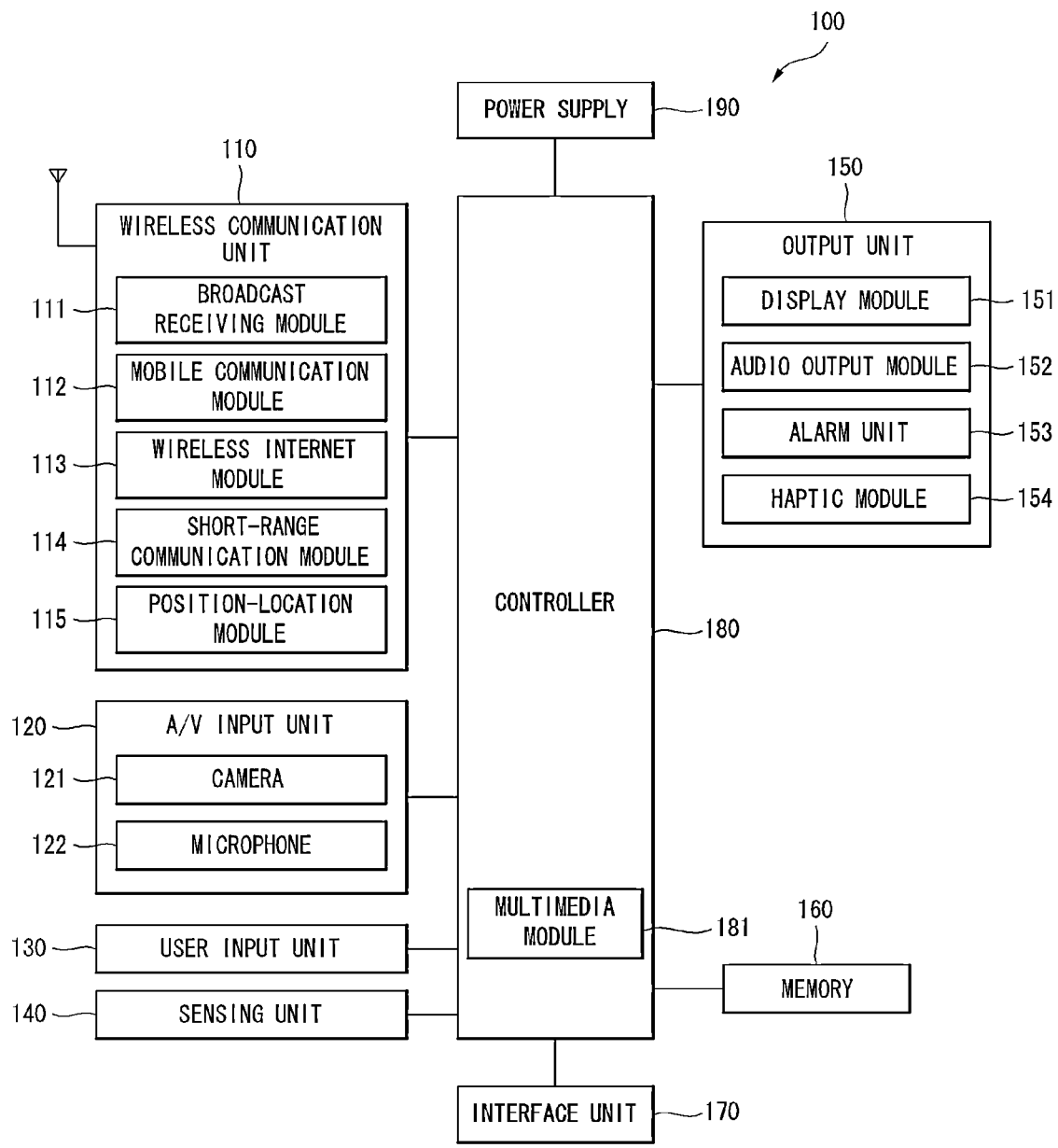
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Furthermore, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Furthermore, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
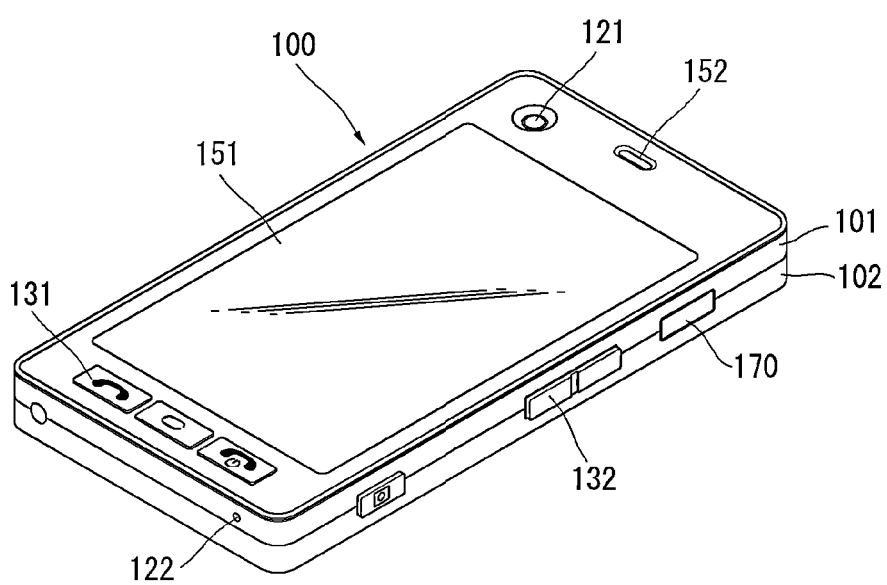
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a casing (or a housing, a cover, etc.) that forms an exterior of the mobile terminal 100. In this embodiment, the casing may be divided into a front casing 101 and a rear casing 102. Various electronic components may be arranged in the space formed between the front casing 101 and the rear casing 102. At least one middle casing may be additionally provided between the front casing 101 and the rear casing 102.

The casings may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front casing 101.

The display 151 may occupy most of the main face of the front casing 101. The audio output unit 152 and the camera 121 may be arranged in a region in proximity to one of both ends of the display 151 and the user input unit 131, and the microphone 122 may be located in a region in proximity to the other end of the display 151. The user input unit 132 and the interface 170 may be arranged (or provided) on sides of the front casing 101 and the rear casing 102.

The user input unit 130 may receive commands for controlling the operation of the mobile terminal 100, and may include a plurality of operation units 131 and 132. The operation units 131 and 132 may be referred to as manipulating portions and may employ any tactile manner in which a user operates the operation units 131 and 132 while having tactile feeling.

The first and second operation units 131 and 132 may receive various inputs. For example, the first operation unit 131 may receive commands such as start, end and scroll and the second operation unit 132 may receive commands such as control of a volume of sound output from the audio output unit 152 or conversion of the display 151 to a touch recognition mode.

Figure 2B:
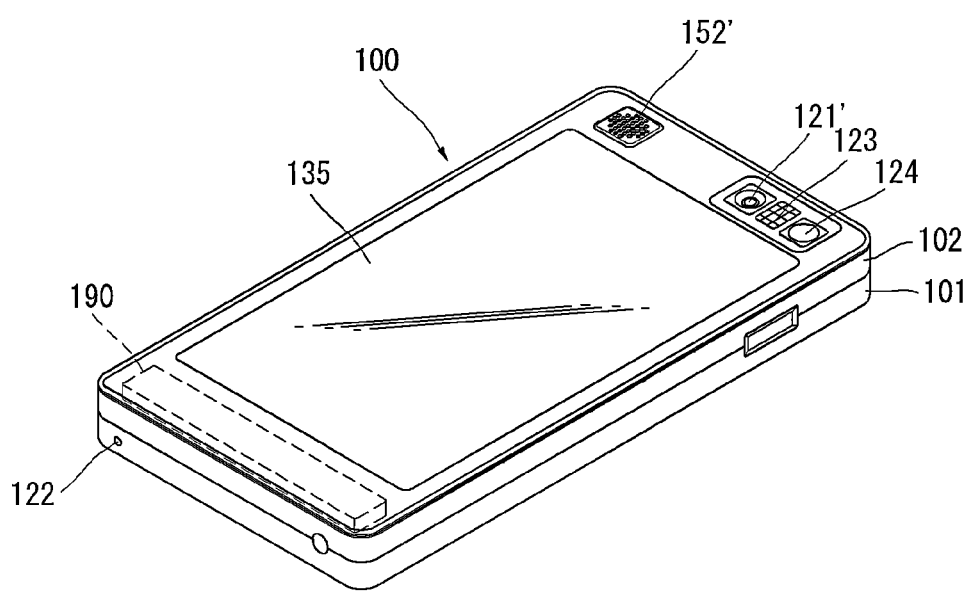
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear casing 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases.

The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear casing 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear casing 102.

The touch pad 135 may operate in connection with the display 151 of the front casing 101. The touch pad 135 may be located in parallel with the display 151 behind the display 151. The touch panel 135 may be identical to or smaller than the display 151 in size.

Figure 2C:
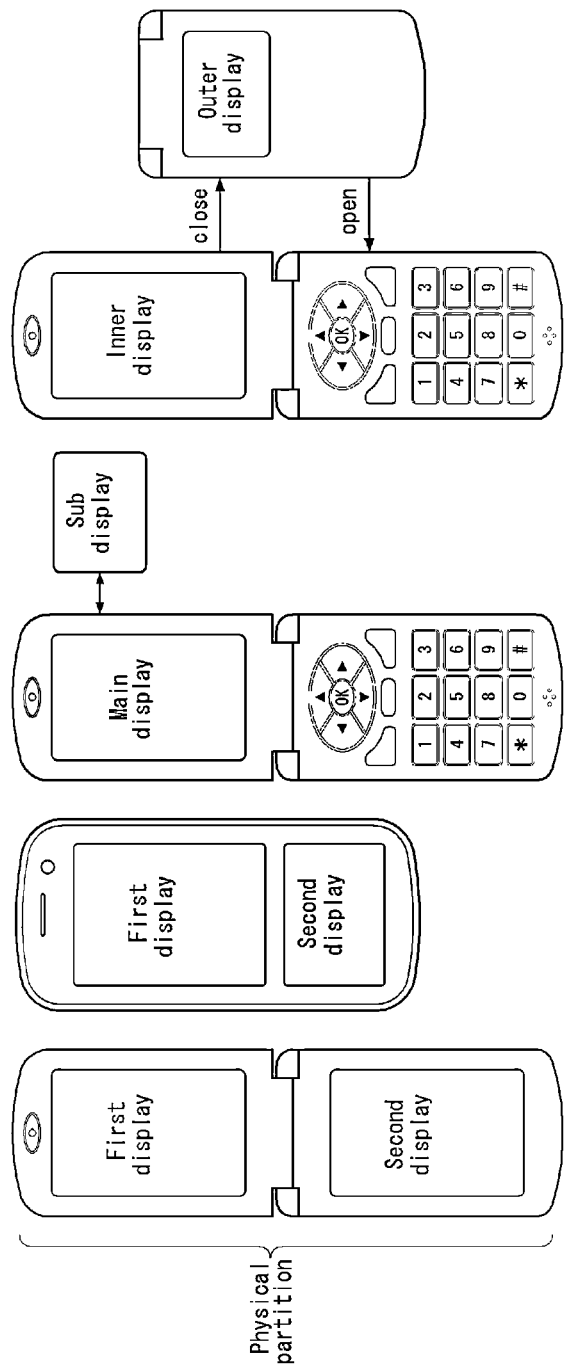
FIGS. 2C and 2D illustrate forms of the mobile terminal and display screens according to various embodiments.
Figure 2D:
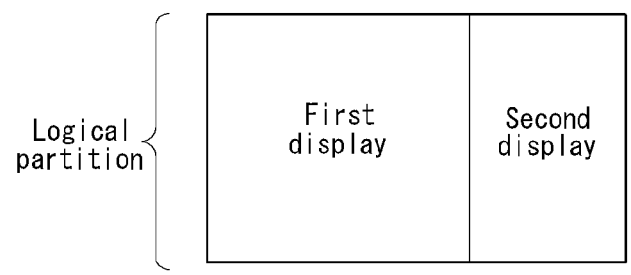

FIGS. 2C and 2D illustrate the mobile terminal 100 and the display 151 according to various embodiments.

Referring to FIG. 2C, the display 151 may include a first display and a second display that are physically separated from each other. In a folder type or slide type mobile terminal having two bodies connected through a hinge or a slide, the first display (or main display) may be formed on the inner face or outer face of one of the bodies, and the second display (or sub display) may be formed on the inner face or outer face of the other body. The sub display may be separated from the mobile terminal and may be detachably combined with the mobile terminal body through an interface to display data from the mobile terminal 100.

The display 151 may include first and second displays that may be logically separated from each other in a display panel, as shown in FIG. 2D.

Figure 3:
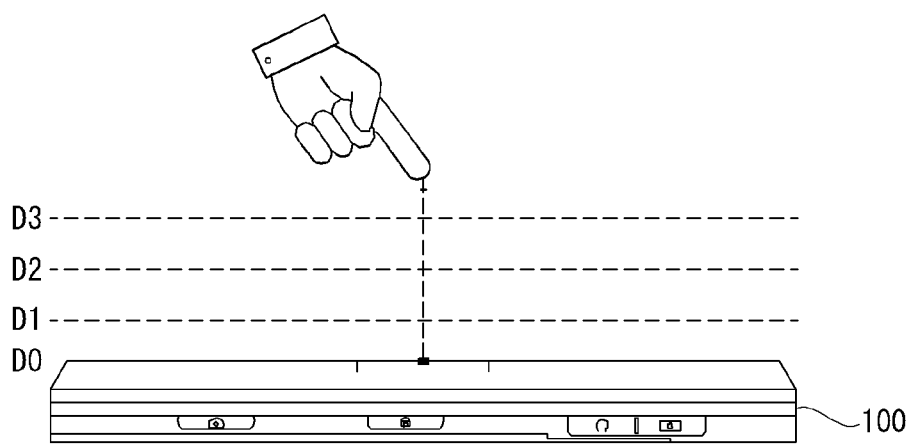
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 6:
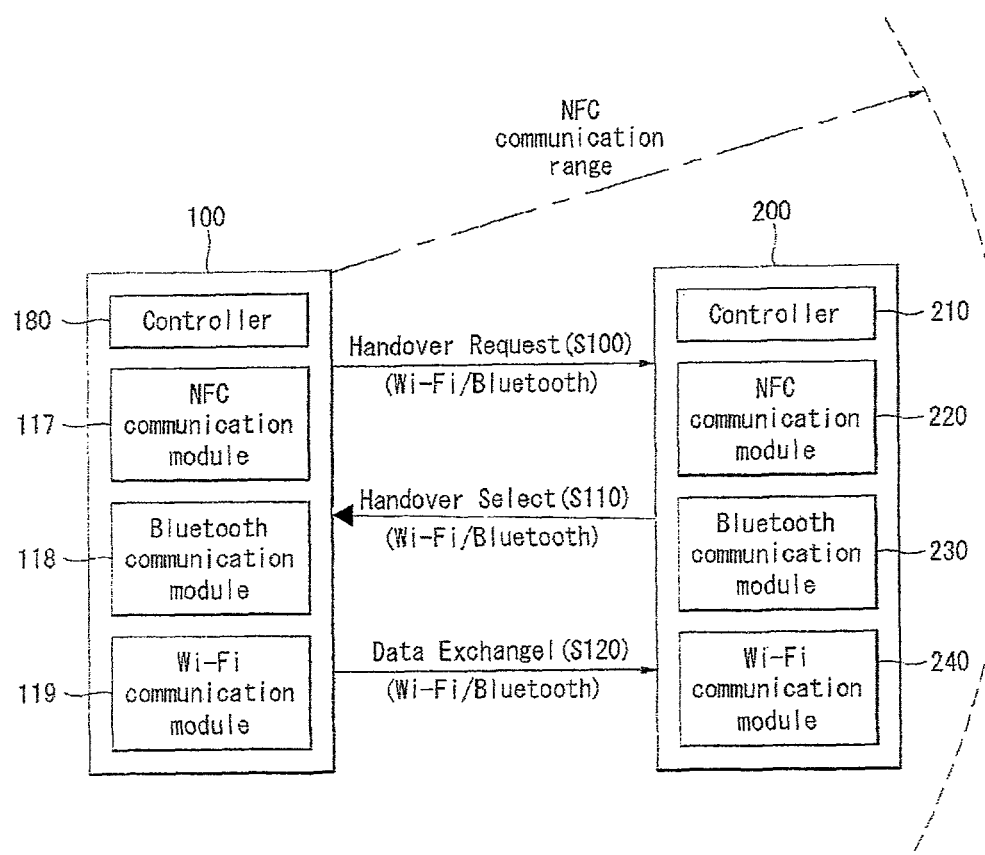
FIG. 6 illustrates an example in which a mobile terminal according to an embodiment of the present invention forms a communication link with another electronic device.

FIG. 6 is a block diagram showing a short range communication module 114 of the mobile terminal 100 according to an embodiment. As shown in FIG. 6, the short range communication module 114 may include a near field communication (NFC) module 117, a Bluetooth communication module 118 and so on.

The NFC communication module 117 may perform data communication with devices positioned at a distance within 10 cm (preferably within 4 cm) using very short-range contactless data transfer technology related to radio frequency identification (RFID). An electronic device that adapts NFC technology may communicate with another electronic device that adapts NFC technology through at least one of a reader mode, a card emulation mode, and/or a pier to pier mode, for example. The NFC communication module 117 may be described with reference to FIG. 5.

The Bluetooth communication module 118 may perform data communication with devices within a radius 10 to 100 m using Bluetooth, which is one type of short range wireless communication formats. For reference, Bluetooth is short range wireless networking technology that was developed by a Bluetooth special interest group (SIG).

The block diagram shown in FIG. 6 is an example of the short range communication module 114 according to the present embodiment, and elements of the short range communication module 114 may not be essential elements. The short range communication module 114 may include elements more than or fewer than shown in FIG. 6.

Figure 5:
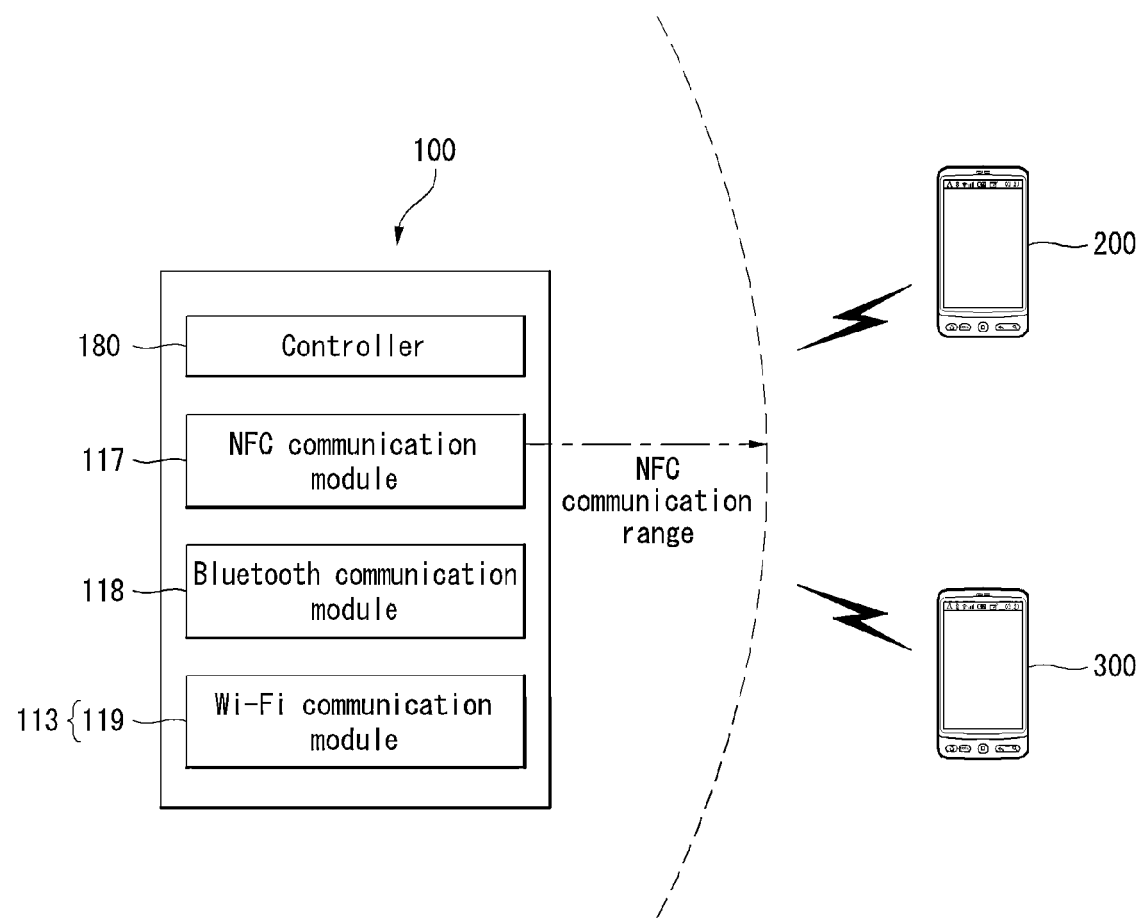
FIG. 5 is a diagram illustrating a system environment including a mobile terminal according to an embodiment of the present invention.

FIG. 5 is a diagram illustrating a system environment including the mobile terminal 100 according to an embodiment of the present invention. As shown in FIG. 5, the system environment may be formed with the mobile terminal 100 according to the present embodiment and one or more other electronic devices 200 and 300 that can form an NFC link with the mobile terminal 100.

Because these are not essential elements of the system environment, the system environment may include elements fewer than or more than those shown in FIG. 5. Furthermore, in FIG. 5, in order to mainly describe a communication link forming characteristic of the mobile terminal 100, only constituent elements necessary for forming a communication link are briefly shown.

In FIG. 5, the system environment is formed with mobile terminals 100, 200, and 300, but the electronic devices 100, 200, and 300 described in this document may be a random electronic device for supporting NFC communication. That is, the electronic devices 100, 200, and 300 may be a mobile terminal such as a mobile phone, a smart phone, and a tablet PC for supporting NFC communication and may be an electronic device such as a printer, a television, a digital television, a computer, and an audio device. Hereinafter, an electronic device having an NFC communication function may be referred to as an NFC electronic device.

Furthermore, in FIG. 5, the mobile terminal 100 forms an NFC link with the other electronic devices 200 and 300 based on NFC communication technology, which is a kind of short range communication technology, but a range of the present invention is not limited thereto. For example, the mobile terminal 100 may form a wireless communication link with the other electronic devices 200 and 300 using short range wireless communication technology other than NFC communication technology.

Referring again to FIG. 5, the mobile terminal 100 includes the controller 180, the NFC communication module 117, the Bluetooth communication module 118, and a Wi-Fi communication module 119.

The controller 180 controls constituent elements within the mobile terminal 100. The NFC communication module 117 enables the mobile terminal 100 to form an NFC link with the other electronic devices 200 and 300 that support NFC communication. The NFC communication module 117 may indicate an NFC forum device. In this document, the NFC communication module 117 may be referred to as a short range communication means.

As shown in FIG. 5, the NFC communication module 117 forms an NFC link through tagging with the NFC communication module of the other electronic devices 200 and 300 within an NFC communication range.

The NFC communication module 117 communicates in various modes with the NFC communication module of the other electronic devices 200 and 300. For example, the various modes may include a card emulation mode, a reader mode, and a peer to peer mode.

When the NFC communication module 117 operates in the card emulation mode, the NFC communication module 117 of the mobile terminal 100 functions as a card, i.e., a tag. In this case, NFC communication modules of the other electronic devices 200 and 300 operate in a reader mode and acquire data from the NFC communication module 117 of the mobile terminal 100.

When the NFC communication module 117 operates in the reader mode, the NFC communication module 117 of the mobile terminal 100 functions as a reader. In this case, the NFC communication module 117 of the mobile terminal 100 acquires data from the NFC communication modules of the other electronic devices 200 and 300 operating in an emulation mode.

When the NFC communication module 117 operates in the peer to peer mode, the NFC communication module 117 of the mobile terminal 100 and the NFC communication modules of the other electronic devices 200 and 300 can exchange data.

A mode of the NFC communication module 117 is determined according to a predetermined reference. For example, a mode of the NFC communication module 117 may be set according to a user input, or predetermined algorithm.

The mobile terminal 100 may form an NFC link through the NFC communication module 117 with the other electronic devices 200 and 300 and then form a communication link of kinds different from the NFC link with the other electronic devices 200 and 300 through the Bluetooth communication module 118 and/or the Wi-Fi communication module 119. Therefore, even if the NFC communication link is disconnected, the mobile terminal 100 can continue to perform data communication with the other electronic devices 200 and 300 through the Bluetooth communication module and/or the Wi-Fi communication module.

In this document, after the NFC link is formed, a series of processes of forming another communication link in order to enable the mobile terminal 100 to continue to communicate with the other electronic devices 200 and 300 using other wireless communication technology are referred to as handover.

Referring to FIG. 5, in the mobile terminal 100 according to the present embodiment, handover from an NFC communication link to a Bluetooth communication link or a Wi-Fi communication link can be performed, but a range of the present invention is not limited thereto. For example, the mobile terminal 100 may perform handover to various communication links such as an RFID communication link and a wireless gigabit (WiGig) communication link.

Although not shown in FIG. 5, the other electronic devices 200 and 300 include elements corresponding to the mobile terminal 100. That is, the other electronic devices 200 and 300 include a controller, an NFC communication module, a Bluetooth communication module, and a Wi-Fi communication module.

In other words, the handover indicates that the mobile terminal 100 performs data communication by forming an NFC link and then forming another communication link with the other electronic devices 200 and 300, and a user can easily form an NFC link through NFC tagging between the mobile terminal 100 and the other electronic devices 200 and 300 and change a communication means to an alternate communication link appropriate for transmitting a longer distance and/or a more amount of data than the NFC link.

Hereinafter, a handover process of the mobile terminal 100 according to the present embodiment will be described in detail with reference to the drawings. For convenience of description, a handover process is described with reference to the system environment shown in FIG. 5. The spirit of the present invention is not limited to a specific environment or a specific device.

FIG. 6 illustrates an example in which the mobile terminal 100 according to an embodiment of the present invention forms a communication link with the other electronic device 200. Hereinafter, a process of forming a communication link will be described with reference to the drawings.

Referring to FIG. 6, the mobile terminal 100 transmits a handover request message to the other electronic device 200 (S100). Before step S100, the mobile terminal 100 and the other electronic device 200 may form a communication link through a first communication means. For example, as shown in FIG. 6, the mobile terminal 100 may form an NFC link through tagging to an NFC communication module 220 included in the other electronic device 200.

When the NFC link is formed, the mobile terminal 100 transmits a message, for example a handover request message, for a handover request to the other electronic device 200 through the NFC link.

As the mobile terminal 100 transmits the handover request message to the other electronic device 200, the mobile terminal 100 and the other electronic device 200 start a protocol for forming another communication link through the NFC link formed between the mobile terminal 100 and the other electronic device 200.

Here, the mobile terminal 100 is a handover requester, and the other electronic device 200 is a handover selector. The handover requester is a device for starting a handover protocol by transmitting a handover request message to another NFC electronic device, and the handover selector is an NFC device for forming and responding a handover selection message as a response to a received handover request message.

That is, the handover requester (i.e. a handover request device) and the handover selector (i.e. a handover selection device) are relative concepts to be determined according to transmission of a handover request message or transmission of a handover selection message. Therefore, when the other electronic device 200 transmits a handover request message to the mobile terminal 100 according to a situation, the mobile terminal 100 may become a handover selector and the other electronic device 200 may become a handover requester.

The handover request message includes information about another communication module in which the mobile terminal 100 supports. For example, as shown in FIG. 6, when the mobile terminal 100 supports Bluetooth and Wi-Fi, the handover request message may include information about Bluetooth and Wi-Fi in which the mobile terminal 100 supports.

A priority order is set to communication technology used for handover and in which the mobile terminal 100 supports. For example, as shown in FIG. 6, the handover request message has information about a communication module for supporting communication technology having a high priority order at the front thereof and has information about a communication module for supporting communication technology having a low priority order at the rear thereof. Referring to the handover request message shown in FIG. 6, it can be seen that information about a Wi-Fi communication module has a priority order higher than information about a Bluetooth communication module.

The other electronic device 200, having received the handover request message transmits a response to the handover request message to the mobile terminal 100 (S120). For example, the other electronic device 200 may generate a handover selection message as an example of a response to the handover request message through the NFC link and transmit the generated handover selection message to the mobile terminal 100.

The other electronic device 200 determines a communication module included in the mobile terminal 100 by analyzing the handover request message and provides information about the communication module included in the other electronic device 200 to the mobile terminal 100 according to the determination. That is, information about communication module included in the handover selection message includes information about a communication module included in the other electronic device 200 among communication modules included in the mobile terminal 100.

Referring to FIG. 6, a controller 210 of the other electronic device 200 determines that the Bluetooth communication module 118 and the Wi-Fi communication module 119 are included in the mobile terminal 100 by analyzing the received handover request message and transmits a handover selection message including information about a Bluetooth communication module 230 and a Wi-Fi communication module 240 included in the other electronic device 200 to the mobile terminal 100 (S110).

When a handover selection message is received from the other electronic device 200, the controller 180 of the mobile terminal 100 determines that the Bluetooth communication module 230 and the Wi-Fi communication module 240 are included in the other electronic device 200 by analyzing the handover selection message and acquires information thereof.

Thereafter, the mobile terminal 100 forms a communication link with communication modules included in the other electronic device 200 based on the acquired information and performs data communication with the other electronic device 200 through the formed communication link (S120).

For example, in order to change an NFC communication link with the other electronic device 200 to a Bluetooth communication link, the controller 180 of the mobile terminal 100 may perform Bluetooth pairing with the other electronic device 200. Thereby, the mobile terminal 100 can continue to perform communication according to a Bluetooth protocol by converting a communication link with the other electronic device 200 from the NFC communication link to the Bluetooth communication link.

As handover of a communication link between the mobile terminal 100 and the other electronic device 200 is performed from the NFC communication link to the Bluetooth communication link, even if the mobile terminal 100 and the other electronic device 200 are no longer positioned within an NFC communication range shown in FIG. 6, data communication can be performed, and data can be exchanged with a transmission speed faster than the NFC link.

In other words, when the mobile terminal 100 is a smart phone, the user brings the smart phone to a periphery of the other electronic device 200 and performs tagging with the other electronic device 200, and thus an NFC link is formed, and by performing a handover protocol, a communication means can be changed to the Bluetooth communication link. Therefore, even if the user takes a smart phone out of an NFC communication range, the smart phone and the other electronic device 200 can continue to perform data communication through the Bluetooth communication link.

Furthermore, in order to change the NFC communication link with the other electronic device 200 to the Wi-Fi communication link, the controller 180 of the mobile terminal 100 may perform a process of forming a Wi-Fi communication link with the other electronic device 200 and perform data communication with the other electronic device 200 through the formed Wi-Fi communication link. Therefore, the mobile terminal 100 can perform data communication with the other electronic device 200 even outside an NFC communication range with a data transmission and reception speed faster than the NFC communication link.

In this case, when a plurality of communication links that can be changed from the NFC communication link exist, the controller 180 of the mobile terminal 100 may perform handover for only a communication link selected from the plurality of communication links and perform handover to the plurality of communication links. Furthermore, when a communication link for performing handover is selected from a plurality of communication links, the controller 180 may select a communication link according to a predetermined priority order.

Figure 4:
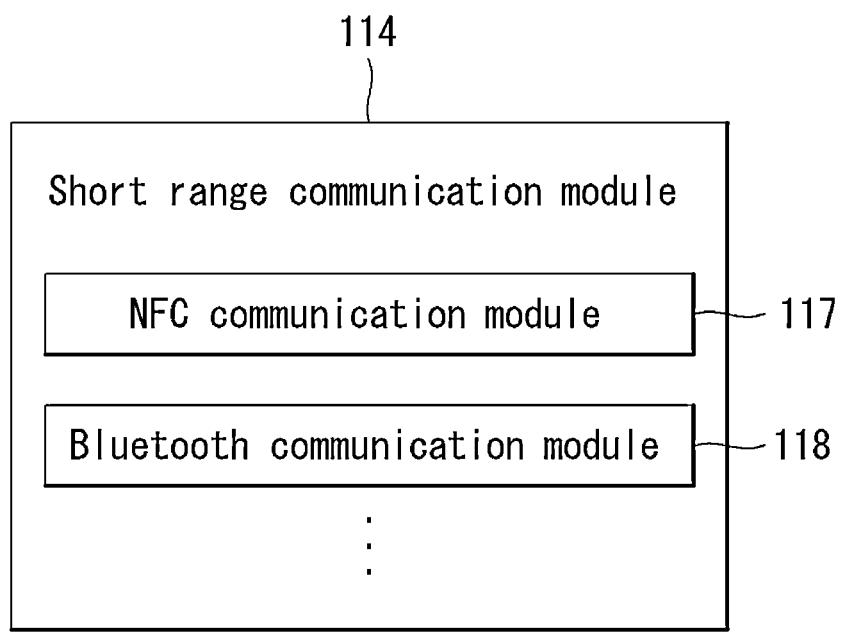
FIG. 4 is a detailed block diagram illustrating a short range communication module of a mobile terminal according to an embodiment of the present invention.

In the foregoing description, a process in which the mobile terminal 100 according to an embodiment of the present invention performs handover of a communication link (e.g., NFC communication link) with a communication module included in the other electronic device 200 to at least one of communication links (e.g., Bluetooth communication link, Wi-Fi communication link) with other communication modules included in the other electronic device 200 has been described with reference to FIGS. 4 and 5.

Hereinafter, a process in which the mobile terminal 100 according to an embodiment of the present invention forms a communication link with a data storage element that stores information about communication modules included in the other electronic device and then performs handover of the formed communication link to a communication link with other communication module included in another electronic device will be described.

Figure 7:
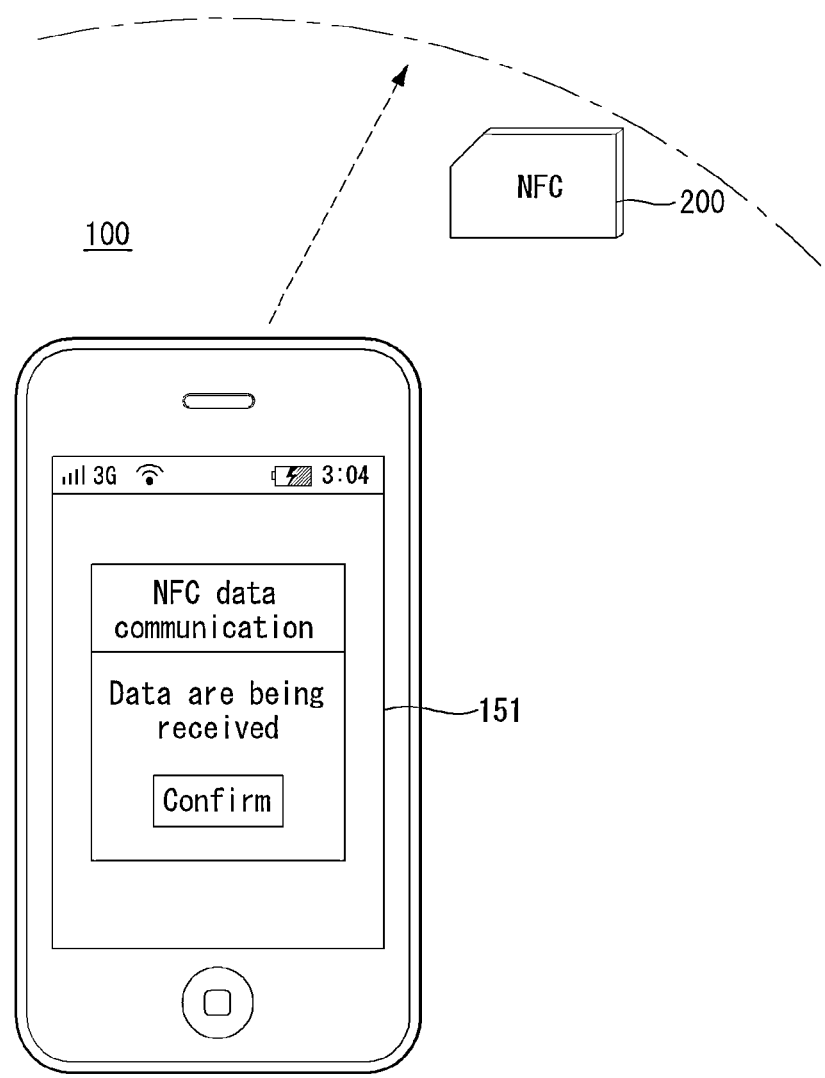
FIG. 7 illustrates an example in which a mobile terminal according to an embodiment of the present invention tagged to an NFC.

As shown in FIG. 7, when the mobile terminal 100 enters within a range that can communicate with the NFC tag 200, the mobile terminal 100 can perform NFC communication with the NFC tag 200. That is, a communication link can be formed between the mobile terminal 100 and the NFC tag 200.

In the display 151 of the mobile terminal 100, content on which the NFC communication link is formed and data are thus received from the NFC tag 200 are displayed.

Figure 8:
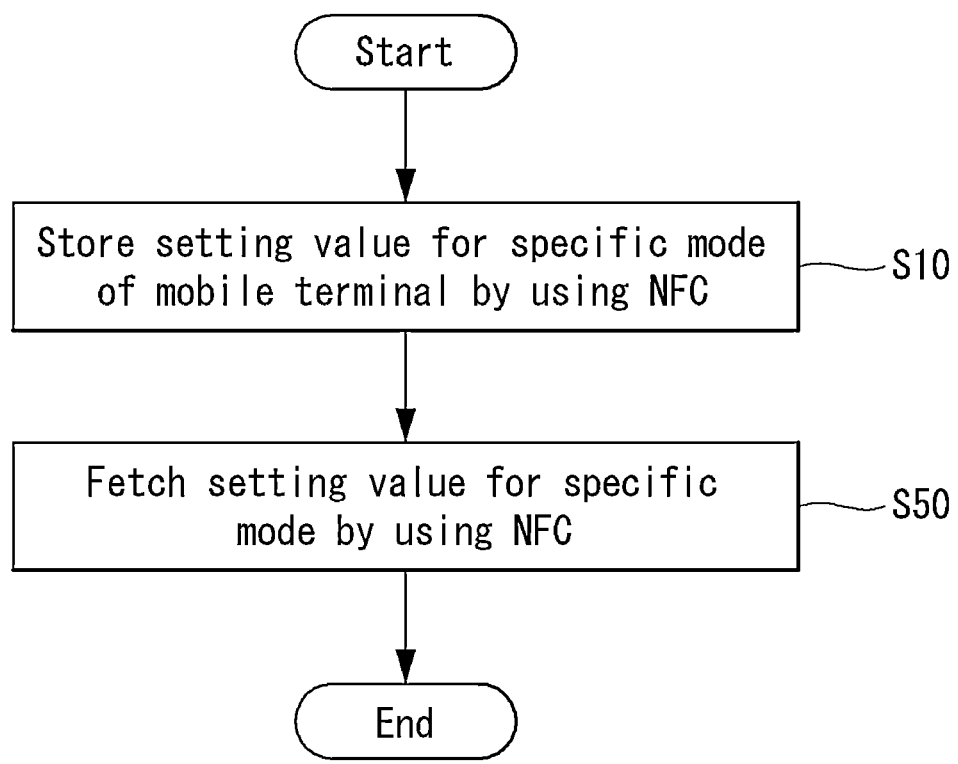
FIG. 8 is a flowchart illustrating the operation of the mobile terminal according to an embodiment of the present invention.

FIG. 8 is a flowchart illustrating the operation of the mobile terminal according to an embodiment of the present invention.

As shown, the controller of the mobile terminal 100 according to the embodiment of the present invention may perform control so that a setting value for a specific operation mode of the mobile terminal 100 is stored using NFC is at step S10.

The specific operation mode may be one of various states in which the mobile terminal 100 is operated. The user and/or the controller 180 of the mobile terminal 100 may perform control so that the mobile terminal 100 is operated in a different state according to circumstances. For example, the different state means that the wireless Internet function of the mobile terminal 100 may be activated at work, the Bluetooth function of the mobile terminal 100 may be activated at home, or the alarm function of the mobile terminal 100 may be activated at night.

The user and/or the controller 180 of the mobile terminal 100 may perform control so that the mobile terminal 100 is in a specific operation mode depending on a specific time and/or place. Modes in which the mobile terminal 100 is operated may include a car mode, an office mode, a home mode, a sleep mode, and a customizing mode. It is to be noted that the operation modes of the mobile terminal 100 according to an embodiment of the present invention are not limited to the above operation modes. For example, the operation modes may include various operation modes under specific situations, such as a meeting mode.

In each of specific operation modes in which the mobile terminal 100 is operated, a specific function of the mobile terminal 100 may be activated or deactivated. The activation or deactivation of the specific function of the mobile terminal 100 may be selected on the assumption that the mobile terminal 100 and/or the user of the mobile terminal 100 are placed in a specific situation. For example, the car mode may be an operation mode on the assumption that a user has ridden on a vehicle. When a driver rides on a vehicle, a hands-free function may need to be activated. To this end, the controller 180 of the mobile terminal 100 according to an embodiment of the present invention may perform control so that the Bluetooth function necessary to activate the hands-free function is activated. Furthermore, in the car mode, the navigation function of the mobile terminal 100 may need to be activated. To this end, the controller 180 of the mobile terminal 100 according to an embodiment of the present invention may execute the navigation function. Furthermore, a specific destination to which a user will move may be set, or an input window through which user input necessary to set the destination can be obtained may be activated.

A setting value in a specific operation mode may be stored using NFC.

The setting value may be a selection value regarding whether a specific function of the mobile terminal 100 will be activated or not in the specific operation mode. For example, in the car mode, the setting value may be a result of the activation or deactivation of the Bluetooth function. The controller 180 and/or the user of the mobile terminal 100 may select the activation or deactivation of the specific function.

A selected setting value may be stored using NFC. That is, it means that storing a setting value for a specific operation mode may be performed according to a communication method using NFC. For example, a user may set the car mode. When setting the car mode, the user may select a desired function, such as the activation of the Bluetooth function. When the selection of a specific function is finished, the user may perform an action of tagging the mobile terminal 100 to an NFC tag.

When the action of tagging the mobile terminal 100 to the NFC tag is performed, a setting value for a specific operation mode may be stored. The stored setting value may be loaded when an action of tagging the mobile terminal 100 to the NFC tag is performed again.

A position where the setting value of the specific operation mode is stored may be various.

The setting value may be transmitted to the NFC tag and then stored therein. It means that a selected setting value may be transmitted to the NFC tag through communication according to an NFC method and then stored therein. A number unique to each mobile terminal 100 and a setting value received from the mobile terminal 100 may be stored in the NFC tag by using the mobile terminal 100. Accordingly, when a specific mobile terminal 100 is tagged, a setting value corresponding to the unique number of the specific mobile terminal 100 may be transmitted to the specific mobile terminal 100. The specific mobile terminal 100 that has received the setting value may set a relevant operation mode and operate in the relevant operation mode.

The setting value may be stored in the memory 160 of the specific mobile terminal 100. It means that, when a tagging action to the NFC tag is performed, a selected setting value may be stored in the memory 160. The setting value stored in the memory 160 may be loaded and used when tagging to the NFC tag is performed again. In this case, the tagging action to the NFC tag may become an operation of initiating the storage to loading of the setting value.

The setting value may be transmitted to another storage device and then stored therein. For example, it means that the setting value transmitted using an NFC method may be transmitted to another device and then stored by a tagging action. In an alternative embodiment, handover information necessary to set up another communication link, such as Wi-Fi, may be obtained through an NFC communication link formed using an NFC method, and the setting value may be transmitted to another device through the communication link set up based on the obtained handover information.

The setting value for the specific operation mode may be fetched using NFC at step S20.

The fetch of the setting value for the specific operation mode may be initiated by a tagging action to an NFC tag. It means that, when the mobile terminal 100 is tagged to a specific tag, a setting value stored in the specific tag may be transmitted to the mobile terminal 100.

When the setting value is received, the controller 180 of the mobile terminal 100 may switch the mobile terminal 100 to the specific operation mode on the basis of the received setting value. When the mobile terminal 100 is switched to the specific operation mode, the mobile terminal 100 may be operated based on the setting value of the switched specific operation mode.

Figure 9:
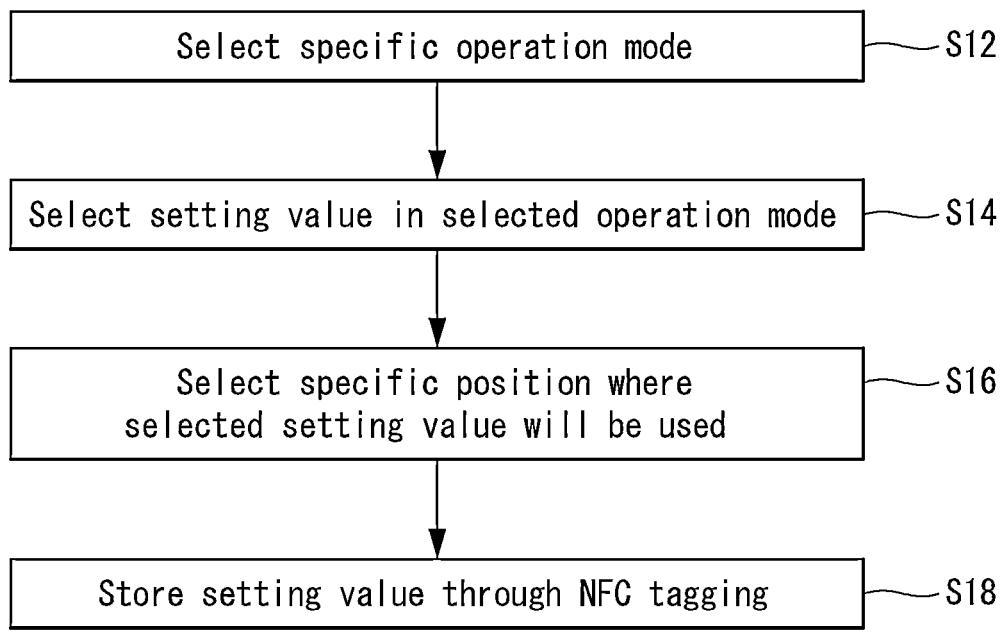
FIG. 9 is a flowchart illustrating a process of storing a setting value for a specific operation mode in FIG. 8.

FIG. 9 is a flowchart illustrating a process of storing the setting value for the specific operation mode in FIG. 8.

As shown, the process of storing the setting value using NFC according to an embodiment of the present invention may include selecting the specific operation mode at step S12.

The specific operation mode may be the car mode, etc. as described above. A user and/or the controller 180 may select the specific operation mode by manipulating the mobile terminal 100.

Next, the setting value in the selected operation mode may be selected at step S14.

When the specific operation mode is selected, the setting value to be used in the selected specific operation mode may be selected. For example, it means that a navigation application may be selected so that it is operated in the car mode.

Next, a specific position at which the selected setting value will be used may be selected at step S16.

The controller 180 may perform control so that the specific operation mode is operated at the specific position. For example, it means that, when tagging is performed at a point A, the mobile terminal 100 may be operated in an AA operation mode and, when tagging is performed at a point B, the mobile terminal 100 may be operated in a BB operation mode.

The operation in the specific operation mode at the specific position may be performed by tagging the mobile terminal 100 to another NFC tag at each specific position. For example, it means that a tag AAA may be placed in the point A and a tag BBB may be placed in the point B. It means that the mobile terminal 100 is operated in the AA operation mode when the mobile terminal 100 is tagged to the tag AAA and the mobile terminal 100 is operated in the BB operation mode when the mobile terminal 100 is tagged to the tag BBB.

A user may activate or deactivate a specific setting value at a specific position. It means that, when tagging is performed at a specific position, a specific setting value may be stored so that a specific function may be performed.

Next, the setting value may be stored through NFC tagging at step S18.

An operation of storing the setting value may be performed through a tagging action on an NFC tag. It means that, when a user performs an NFC tagging action, parameters set so that a specific operation is performed in a specific operation mode may be transmitted through an NFC communication link.

Figure 10:
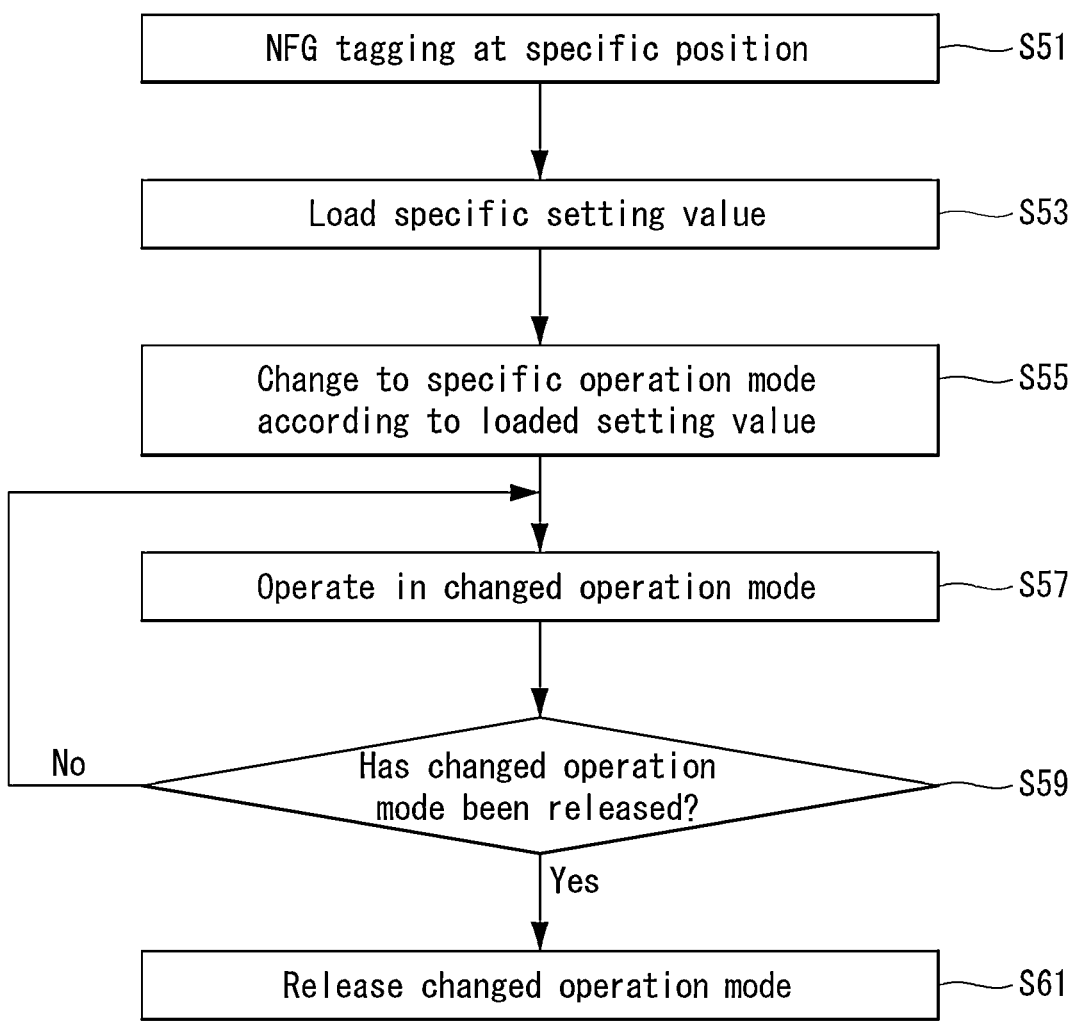
FIG. 10 is a flowchart illustrating a process of fetching a setting value for a specific operation mode in FIG. 8.

FIG. 10 is a flowchart illustrating a process of fetching the setting value for the specific operation mode in FIG. 8.

As shown, the process of fetching the setting value for the specific operation mode may include performing NFC tagging at a specific position at step S51.

An NFC tag where the NFC tagging is performed may be placed at the specific position. For example, it means that a tag for the car mode may be placed within a vehicle or a tag for the office mode may be placed in an office.

A specific setting value for a tag at a specific position may be previously stored by a user. For example, it means that a user has selected a setting value for the car mode and has tagged the mobile terminal 100 to a tag for the car mode as described above.

When the tagging action is performed on an NFC tag, the specific setting value may be loaded at step S53.

The loading of the specific setting value may be performed through an NFC communication link set up by the NFC tag action. That is, it means that the setting value stored through an NFC channel formed between the NFC tag and the mobile terminal 100 may be transmitted to the mobile terminal 100.

Next, the mobile terminal 100 may be switched to a specific operation mode according to the loaded setting value at step S55 and may be operated in the specific operation mode at step S57.

The setting value may correspond to the specific operation mode. For example, the setting value may correspond to the car mode. If an obtained setting value corresponds to the car mode, the controller 180 may change the operation mode of the mobile terminal 100 to the car mode. The mobile terminal 100 may be operated in the changed operation mode.

Whether the changed operation mode will be released or not may be performed at step S59, and the changed operation mode may be released at step S61.

The release of the operation mode may be performed by the manipulation of a user and/or the control operation of the controller 180. For example, when a user takes an action of tagging a specific NFC tag already tagged again, a relevant operation mode may be released. In an alternative embodiment, when a user changes a setting value, a relevant operation mode may be released. In another alternative embodiment, when a user gets out of a specific range from a tagged position, a specific operation mode may be released. In yet another alternative embodiment, when a specific time elapses, a relevant operation mode may be released.

FIGS. 11 to 14 are diagrams showing an operation of storing the setting value for the specific operation mode in FIG. 8.

As shown, the mobile terminal 100 according to an embodiment of the present invention may set a specific operation mode according to the manipulation of a user, determine the setting value of a function that will be operated in the specific operation mode, and store the determined setting value.

Figure 11:
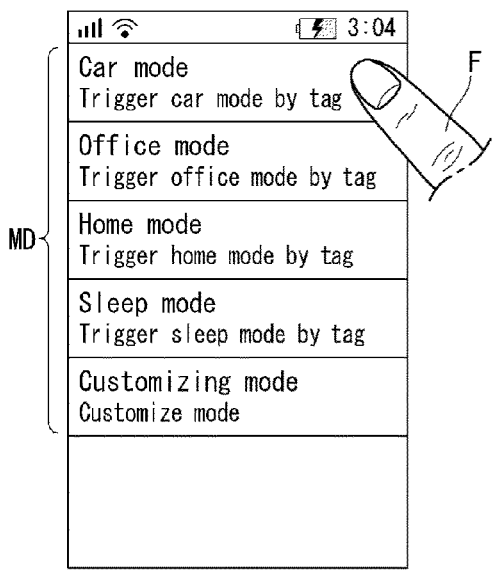
FIGS. 11 to 16 are diagrams showing an operation of storing a setting value for a specific operation mode in FIG. 8.
Figure 11:
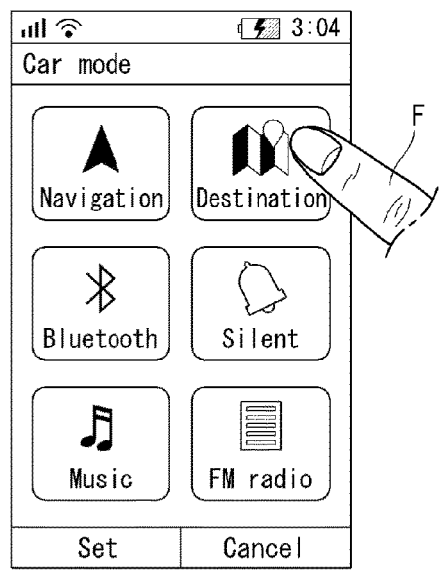
Figure 11:
Figure 11:
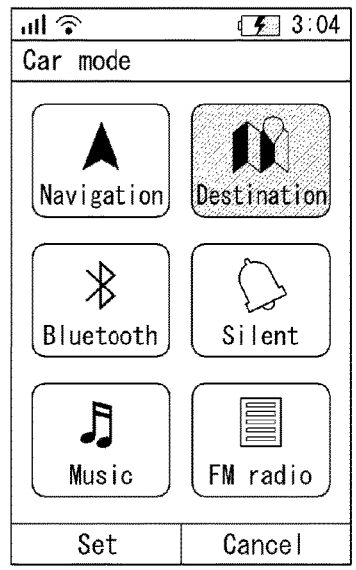

As shown in FIG. 11(*a*), the display 151 of the mobile terminal 100 may display operable modes MD. A user may select a specific one of the modes MD by using a finger F, etc. For example, a user may select a car mode.

As shown in FIG. 11(*b*), when a specific operation mode is selected, functions that may be used in the selected specific operation mode may be displayed. For example, in the car mode, it means that functions, such as navigation, Bluetooth, music, destination setting, silence, and radio, may be displayed. A user may select a desired function to be set, from the displayed functions. For example, the user may select the destination setting function.

As shown in FIG. 11(*c*), a map screen for selecting a specific point by using the destination setting function selected by the user may be displayed. The user may select a destination in the displayed map screen.

As shown in FIG. 11(*d*), when a series of manipulations necessary to activate the destination setting function are finished, the activation of the destination setting function may be visually displayed.

Figure 12:
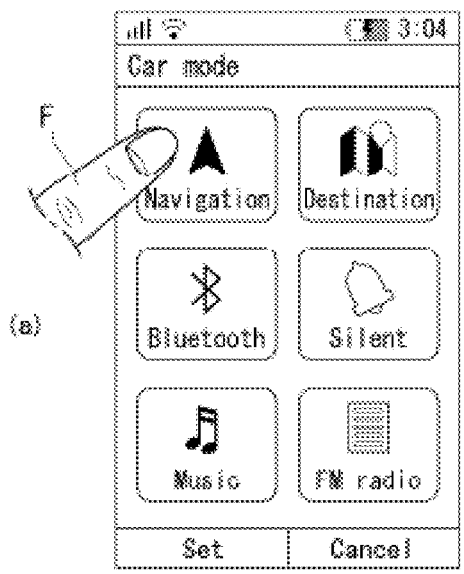
Figure 12:
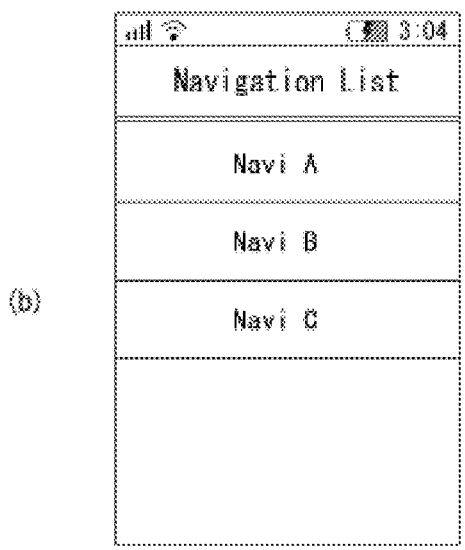

As shown in FIG. 12(*a*), a user may select the navigation function from the displayed functions.

As shown in FIG. 12(*b*), a plurality of navigation applications may be installed in the mobile terminal 100. For example, it means that navigation applications A to C may be installed in the mobile terminal 100. If a plurality of navigation applications is installed, the controller 180 may perform control so that what navigation application will be operated in a specific operation mode is selected. That is, it means that a list of available navigation applications may be displayed so that a user selects a specific navigation application from the available navigation applications. When the specific operation mode is entered, the controller 180 may perform control so that the selected navigation application is operated.

Figure 13:
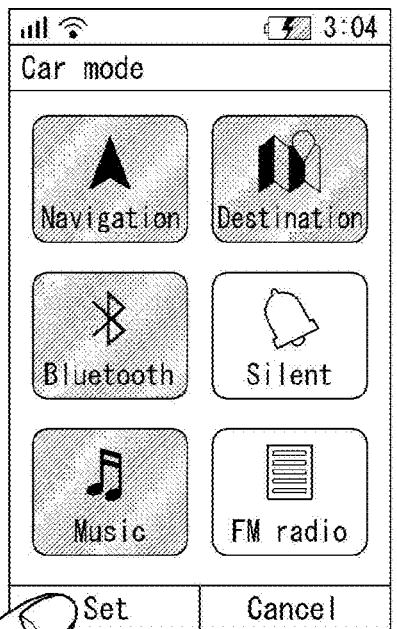
Figure 13:
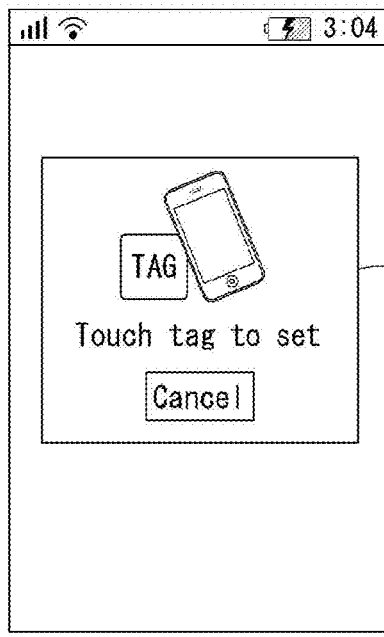

As shown in FIG. 13(*a*), when a user selects functions through a series of processes, the display 151 may display the selected functions so that the selected functions are distinguished from unselected functions. When desired functions are selected, a user presses a set button.

As shown in FIG. 13(*b*), the controller 180 may perform control so that a first pop-up window P1, displaying a message that prompts a user to tag an NFC tag, is displayed.

Figure 14:
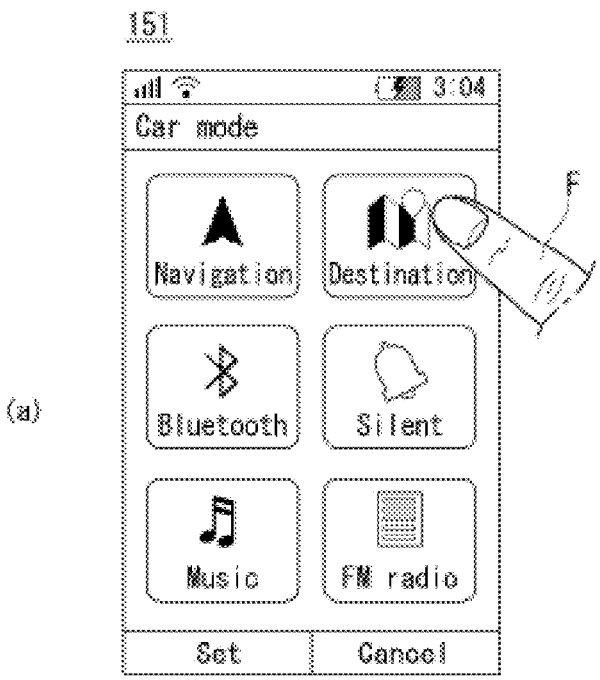
Figure 14:

As shown in FIG. 14(*a*), a user may select the destination setting function.

As shown in FIG. 14(*b*), when the user selects the destination setting function, a list of previously stored destinations may be displayed. When a user selects a specific place in the displayed destination list and a relevant operation mode is entered, the controller 180 may perform control so that the specific place is automatically selected as the destination. That is, it means that a specific destination may be selected and thus the navigation application may be operated even without an additional operation.

The controller 180 may perform control so that a specific destination is automatically selected from a list of previously stored destinations on the basis of a current position. For example, it means that, when a user is now placed in a firm and a relevant operation mode is entered, a home may be automatically selected as a destination.

The controller 180 may perform control so that a specific destination is automatically selected by combining a current position and other conditions. For example, it means that, when a user is now placed in a firm, p.m. 6 passes, and a relevant operation mode is entered, a home may be automatically selected as a destination.

Figure 15:
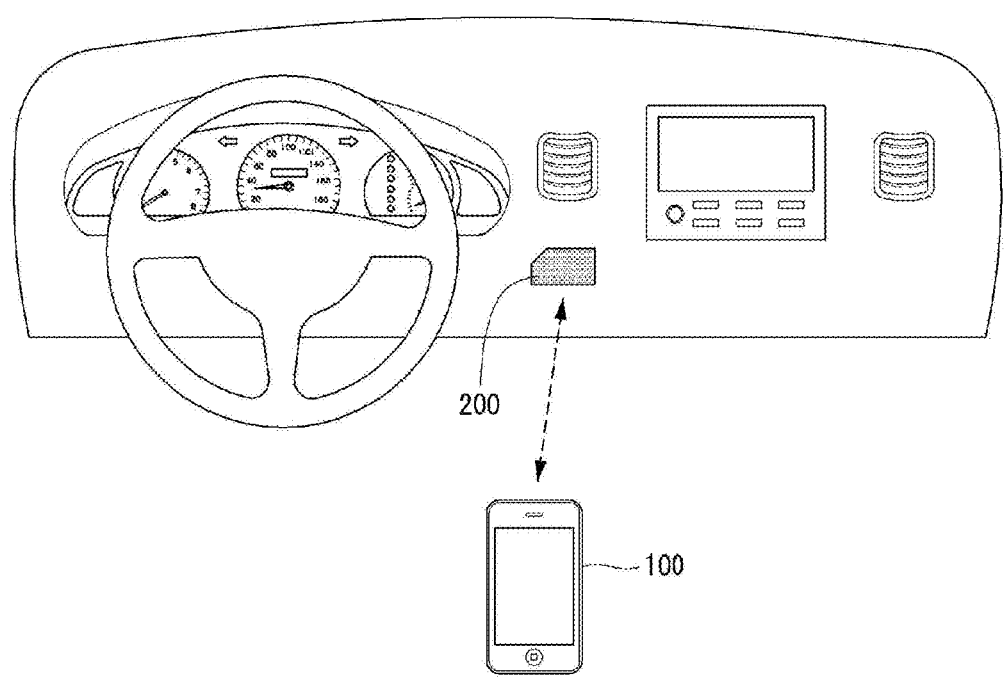

As shown in FIG. 15, a user may tag the mobile terminal 100 to a tag 200 placed within a vehicle.

Figure 16:
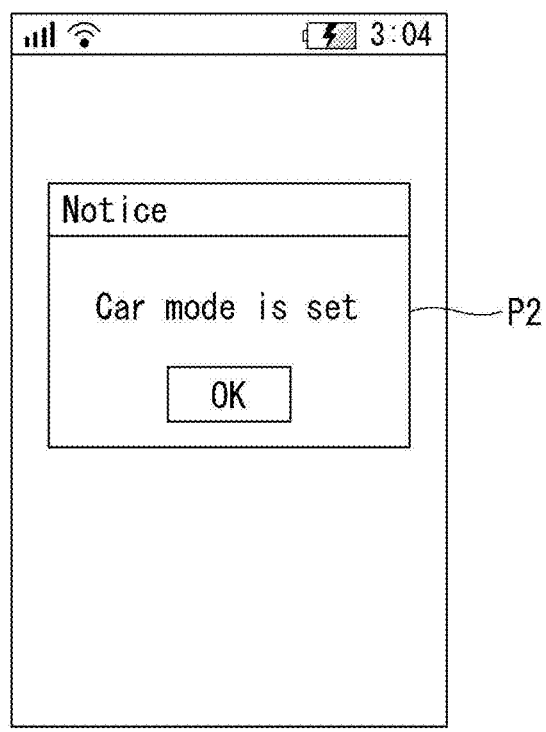

As shown in FIG. 16, when tagging is performed, the display 151 may display a second pop-up window P2 indicating that a specific operation mode (e.g., car mode) has been set.

FIGS. 17 to 20 are diagrams showing other embodiments in which the setting value for the specific operation mode in FIG. 8 is stored.

As shown, the mobile terminal 100 according to an embodiment of the present invention may select a specific operation mode and activate a specific function.

Figure 17:
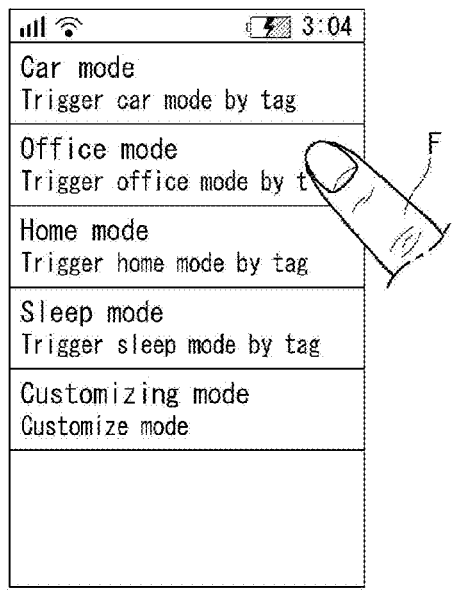
Figure 17:
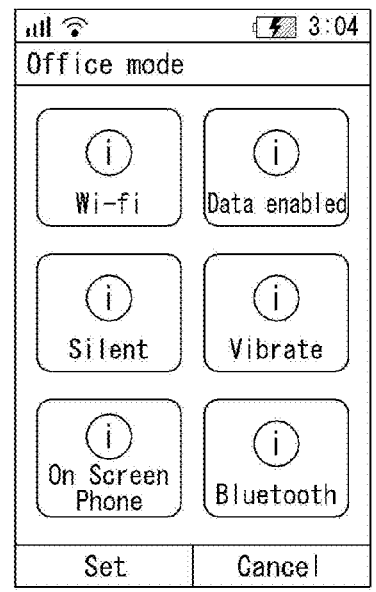
Figure 17:
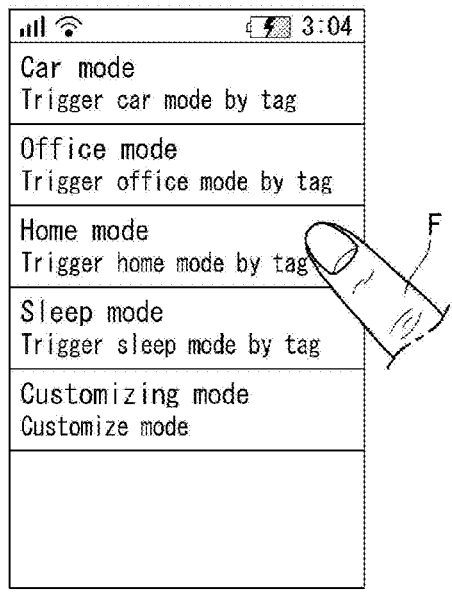
Figure 17:
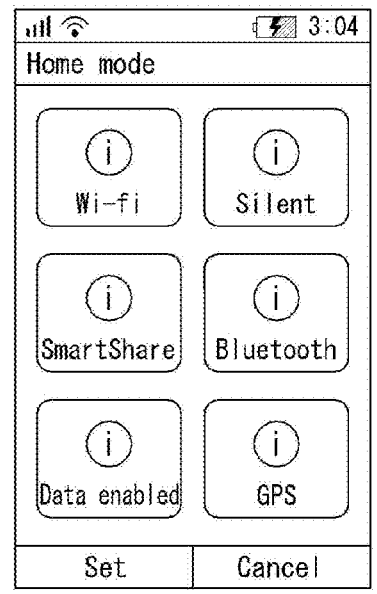

As shown in FIGS. 17(*a*) and 17(*b*), a user may select an office mode. When the office mode is selected, a screen in which functions, such as Wi-Fi setting, silence setting, on-screen phone setting, data communication setting, vibration setting, and Bluetooth setting, can be selected may be displayed.

As shown in FIGS. 17(*c*) and 17(*d*), a user may select a home mode. When the home mode is selected, a screen in which functions, such as Wi-Fi setting, sharing setting, data communication setting, silence setting, Bluetooth setting, and GPS setting, can be selected may be displayed.

Figure 18:
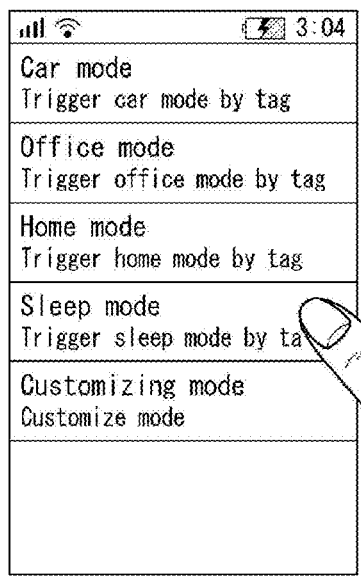
Figure 18:
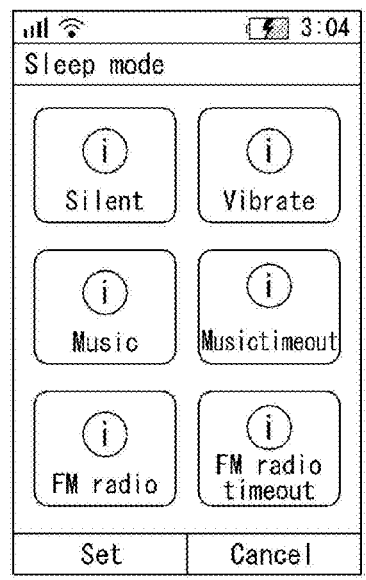

As shown in FIGS. 18(*a*) and 18(*b*), when a user may select a sleep mode. When the sleep mode is selected, a screen in which functions, such as silence setting, music setting, radio setting, vibration setting, music end setting, and radio end time setting, can be selected may be displayed.

The contents of setting that may be selected depending on each mode may be different. That is, it means that setting optimized for a specific operation mode may be selected.

Figure 19:
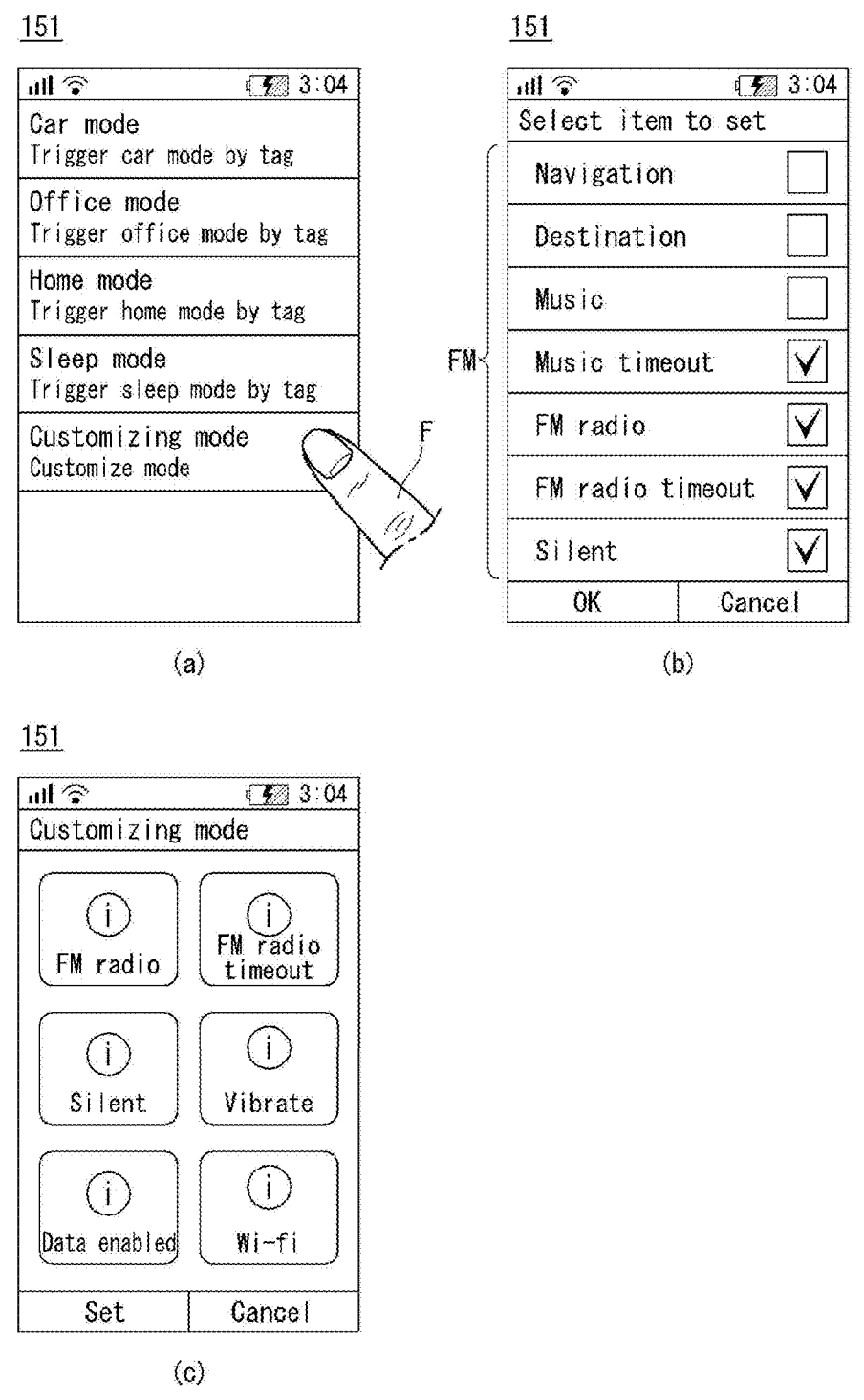

As shown in FIG. 19(*a*), a user may select a customizing mode and select a desired function.

As shown in FIG. 19(*b*), functions FM that may be selected in the mobile terminal 100 may be displayed in the display 151. The functions FM may be functions embedded in the mobile terminal 100 or may be applications that are downloaded from an app store and then installed.

As shown in FIG. 19(*c*), selected functions may be displayed. Accordingly, a user may activate or deactivate a desired function in the customizing mode.

Figure 20:
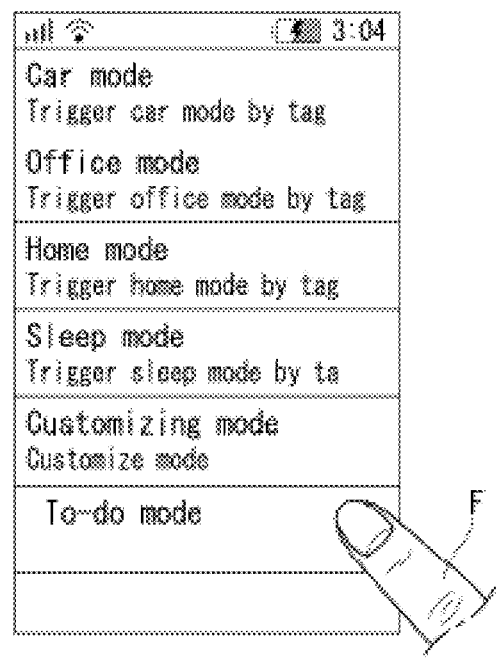
Figure 20:
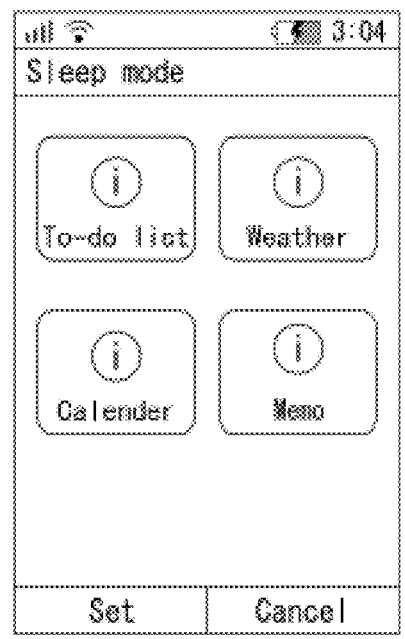

As shown in FIG. 20(*a*), a user may select a to-do mode. The to-do mode may be a mode in which functions related to the schedule of a user are gathered.

As shown in FIG. 20(*b*), when the to-do mode is selected, the controller 180 may perform control so that a screen for selecting or setting an application operated in the to-do mode is displayed. For example, it means that a set of applications related to the scheduling of a to-do list application displaying tasks that must be performed, a calendar application, a memo application, and a weather application, may be displayed.

Figure 21:
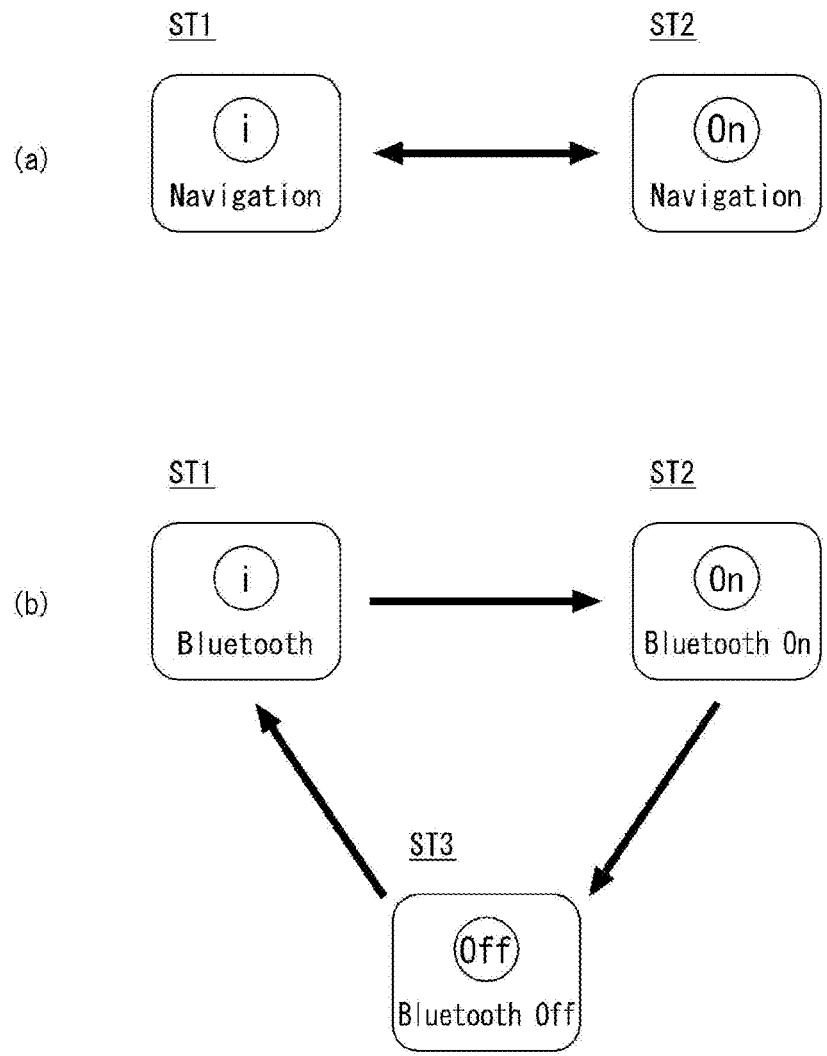
FIG. 21 is a diagram showing a change of an icon in a process of setting a specific operation mode in FIG. 8.

FIG. 21 is a diagram showing a change of an icon in a process of setting a specific operation mode in FIG. 8.

As shown, the controller 180 of the mobile terminal 100 according to an embodiment of the present invention may inform a user whether activation has been performed or not by changing a form of a displayed icon.

As shown in FIG. 21(*a*), an icon may be toggled between a first icon ST1 and a second icon ST2 by the selection of a user and/or the control operation of the controller 180. That is, it means that when the first icon ST1 is touched, an activation option for navigation may be selected and thus the first icon ST1 may be changed to the second icon ST2.

As shown in FIG. 21(*b*), an icon may be sequentially changed to three or more states. That is, when the first icon ST1 is touched, an activation option for Bluetooth may be selected and thus the first icon ST1 may be changed to the second icon ST2. When the second icon ST2 is touched, a deactivation option for Bluetooth may be selected and thus the second icon ST2 may be changed to a third icon ST3. When the third icon ST3 is selected, the third icon ST3 may be changed to the first icon ST1, that is, a state before the function is selected.

Figure 22:
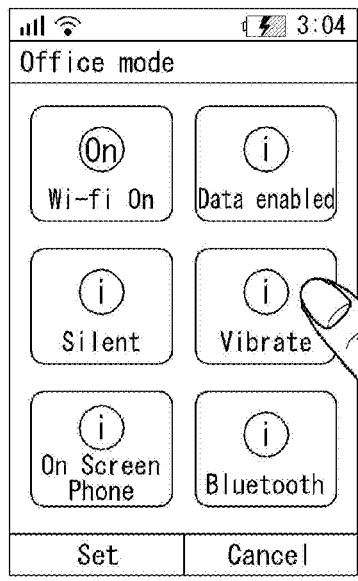
FIGS. 22 and 23 are diagrams showing a process of setting a specific operation mode in FIG. 8.
Figure 22:
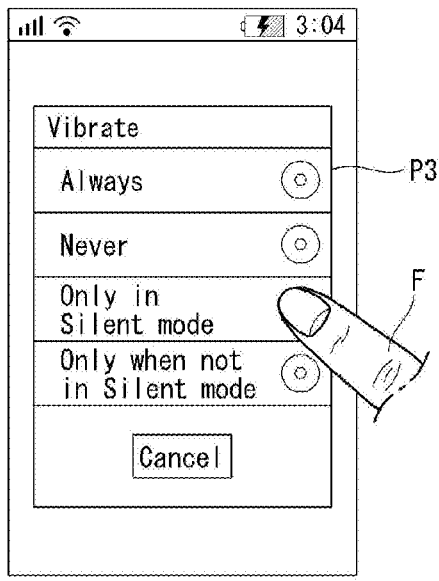
Figure 22:
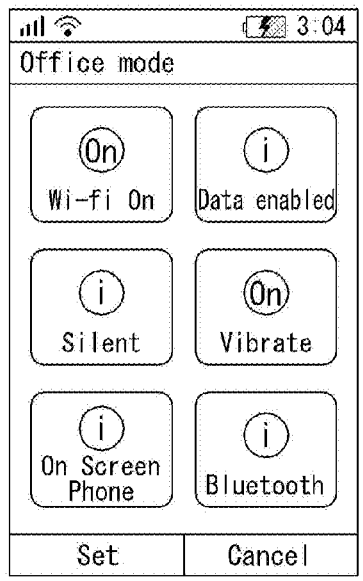
Figure 23:
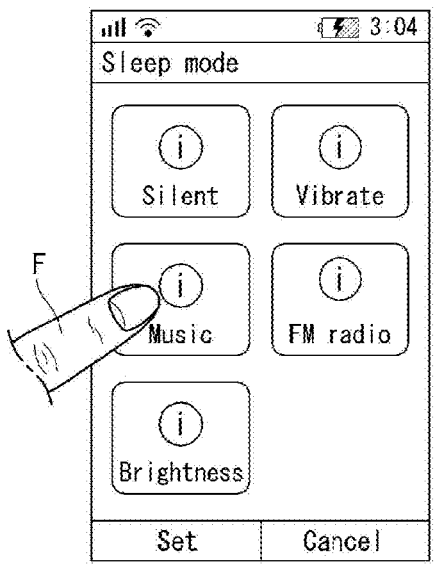
Figure 23:
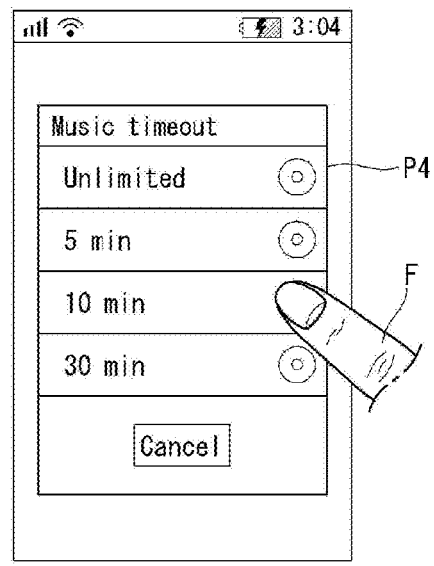
Figure 23:
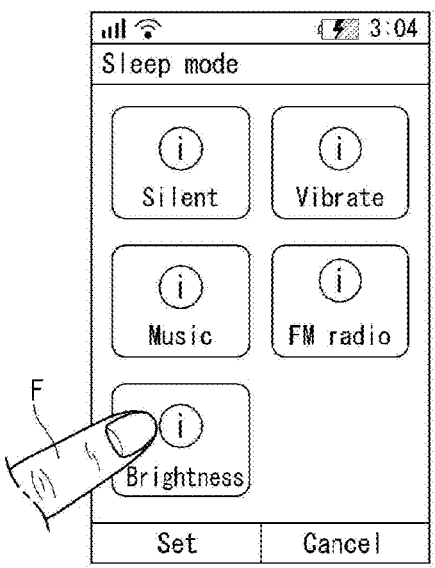
Figure 23:
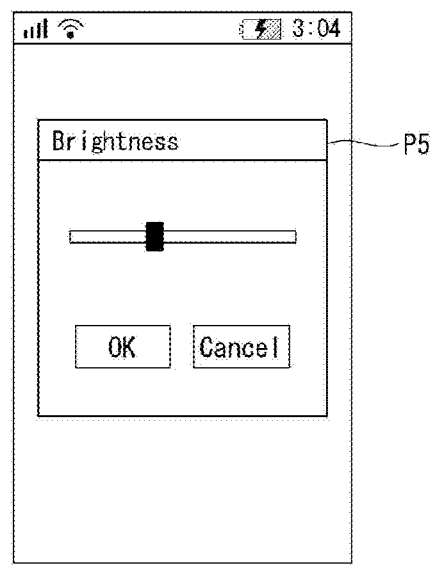

FIGS. 22 and 23 are diagrams showing a process of setting the specific operation mode in FIG. 8.

As shown, the controller 180 of the mobile terminal 100 according to an embodiment of the present invention may perform setting for on down level of a selected specific function.

As shown in FIG. 22(*a*), a user may select a vibration function.

As shown in FIG. 22(*b*), a third pop-up window P3 in which the detailed setting of the vibration function can be selected may be displayed. For example, contents capable of selecting setting, such as setting for always activating or deactivating vibration, may be displayed in the third pop-up window P3.

As shown in FIG. 22(*c*), when the selection of the user is finished, an icon indicating that the vibration function has been selected may be displayed.

As shown in FIGS. 23(*a*) and 23(*b*), a user may select a music function. When the music function is selected a fourth pop-up window P4 in which the play time of music can be selected may be displayed. For example, the user may select an end function after the music is played for 10 minutes. Accordingly, when a sleep mode is activated, the end function of finishing the music after the music is played for 10 minutes may be automatically executed.

As shown in FIGS. 23(*c*) and 23(*d*), a user may select a brightness adjustment function. When the brightness adjustment function is selected, a fifth pop-up window P5 in which brightness can be controlled may be displayed. Accordingly, when a sleep mode is activated, the brightness of display may be automatically adjusted to a set degree.

FIGS. 24 to 32 are diagrams showing an operation of fetching the setting value for the specific operation mode in FIG. 8.

As shown, the controller 180 of the mobile terminal 100 according to an embodiment of the present invention may perform control so that a specific operation mode is activated when an action of tagging the mobile terminal 100 to a specific tag is performed.

Figure 24:
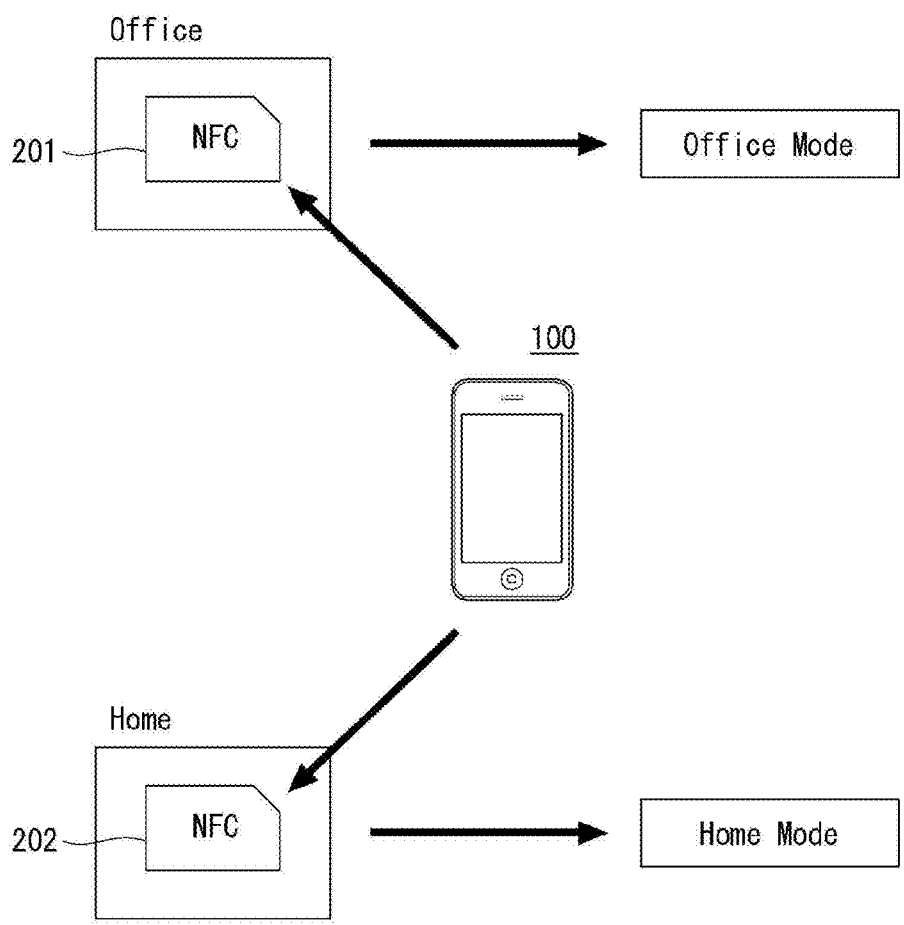
FIGS. 24 to 32 are diagrams showing an operation of fetching a setting value for a specific operation mode in FIG. 8.
Figure 25:
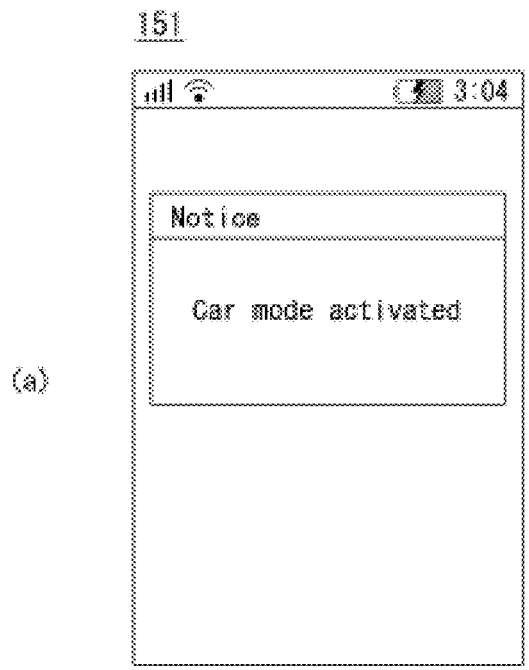
Figure 25:
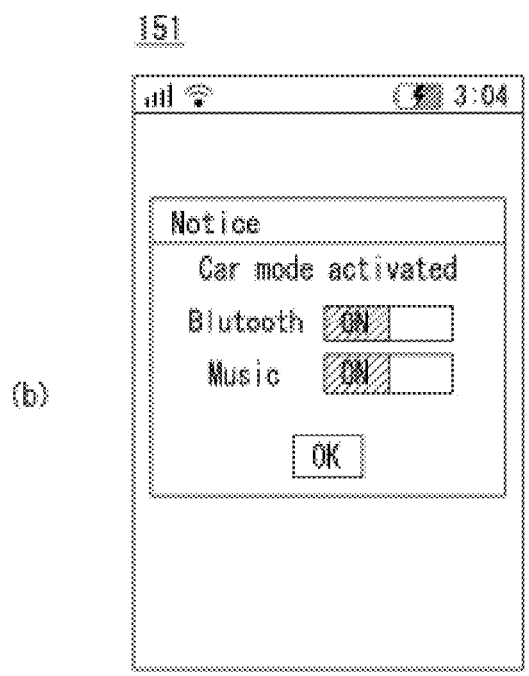
Figure 26:
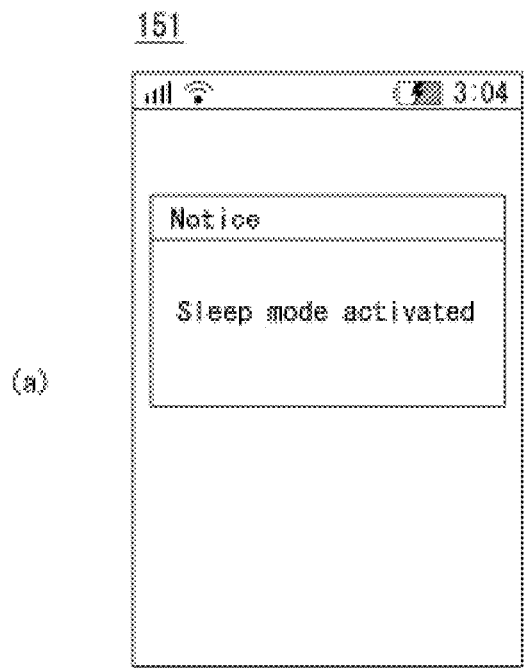
Figure 26:
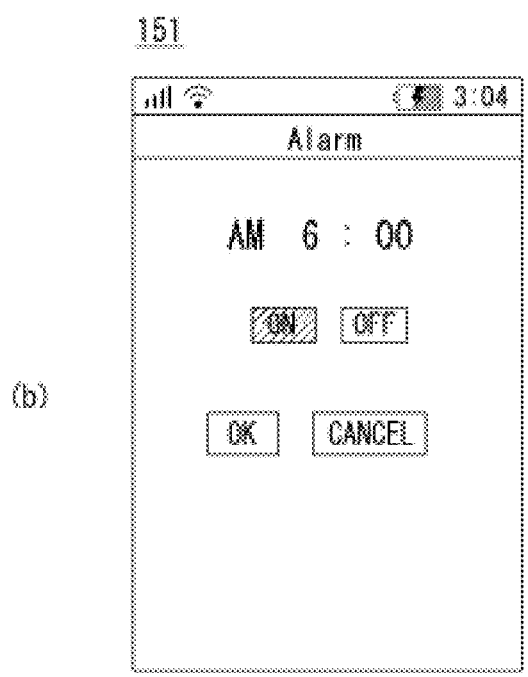
Figure 27:
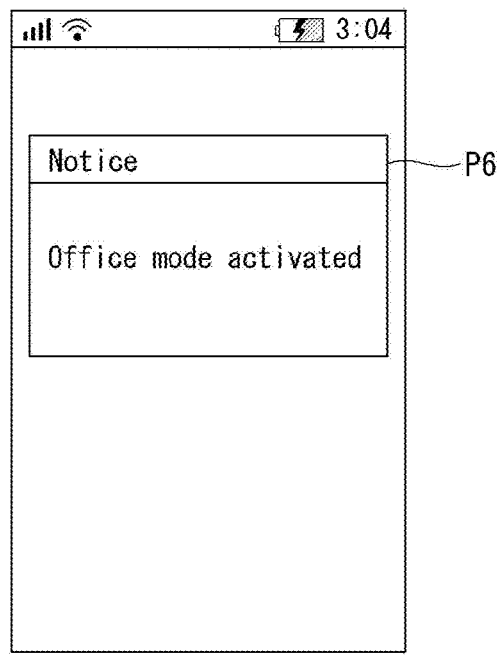
Figure 27:
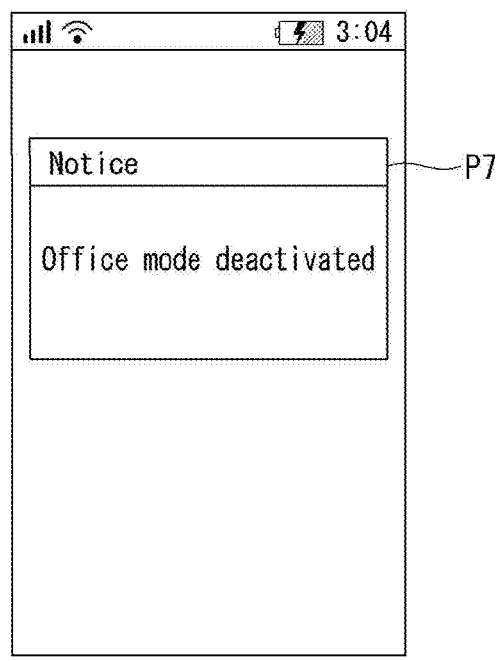

As shown in FIG. 24, a user may tag the mobile terminal 100 to an NFC tag 201 for an office mode. A setting value for setting the office mode might have already been stored in the NFC tag 201 for the office mode.

When the mobile terminal 100 is tagged to the NFC tag 201 for the office mode, the operation mode of the mobile terminal 100 may be changed to the office mode. For example, it means that the brightness of the display 151 may become a maximum, a vibration function may be activated, and a Wi-Fi function may be activated.

When the mobile terminal 100 is tagged to an NFC tag 202 for a home mode, the operation mode of the mobile terminal 100 may be changed to the home mode. For example, it means that a bell function may be activated and a DLNA function may be activated.

When a user performs an action of tagging the mobile terminal 100 to a specific tag, the operation mode of the mobile terminal 100 can be easily switched to the office mode or the home mode. Accordingly, inconvenience that a plurality of functions must be set one by one according to places or circumstances can be obviated.

As shown in FIG. 25(a), the controller 180 may display that a specific operation mode has been activated. For example, the controller 180 may display that the car mode has been activated.

As shown in FIG. 25(b), the controller 180 may provide a screen in which the operations of applications used in a specific operation mode that has been activated can be controlled. For example, the controller 180 may display a selection button capable of turning on or off the operations of a Bluetooth function and a music function that have been set so that they can be used in the activated car mode. A user may select the displayed selection button and control a specific function.

As shown in FIG. 26(a), the controller 180 may display that a specific operation mode has been activated. The activated specific operation mode may be a sleep mode.

As shown in FIG. 26(b), a specific function that has been set so that it is used in the activated specific operation mode may be automatically displayed. For example, it means that, when a sleep mode is entered, a screen in which the alarm time of an alarm function that may be used in the sleep mode can be set may be automatically displayed. A user may control the time when the alarm is operated or may turn on or off the alarm function in the screen.

As shown in FIGS. 27(a) and 27(b), when a specific operation mode is activated or deactivated, a user may be informed of the activation or deactivation through sixth an seventh pop-up windows P6 and P7.

Figure 28:
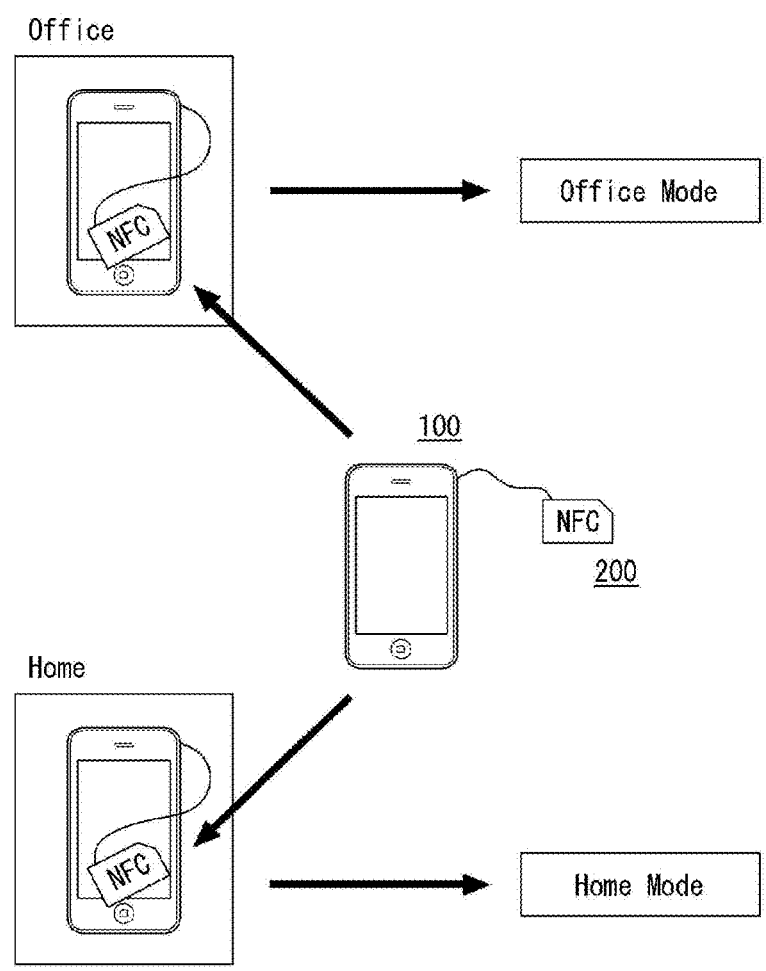

As shown in FIG. 28, an NFC tag 200 may not be fixed to a specific place. For example, it means that the NFC tag 200 may be carried along with the mobile terminal 100 and a specific operation mode may be activated or deactivated by tagging the mobile terminal 100 to the NFC tag 200, if necessary.

A setting value in a specific operation mode and information about whether the specific operation mode will be activated or deactivated at a certain place may be stored in the NFC tag 200. That is, it means that pieces of information about a plurality of modes may be stored in one NFC tag 200.

When a user tags the mobile terminal 100 to the NFC tag 200 in an office, the office mode may be activated. Furthermore, when a user tags the mobile terminal 100 to the NFC tag 200 at home, the home mode may be activated.

The location information module 115 may be included in the mobile terminal 100. For example, it means that the current position of the mobile terminal 100 may be detected through a GPS. Accordingly, when the detected current position of the mobile terminal 100 is within a predetermined specific area, the operation mode of the mobile terminal 100 may be switched to a mode corresponding to the specific region. Accordingly, inconvenience according to the installation of tags can be reduced because a separate tag does not need to be installed in each specific place.

Figure 29:
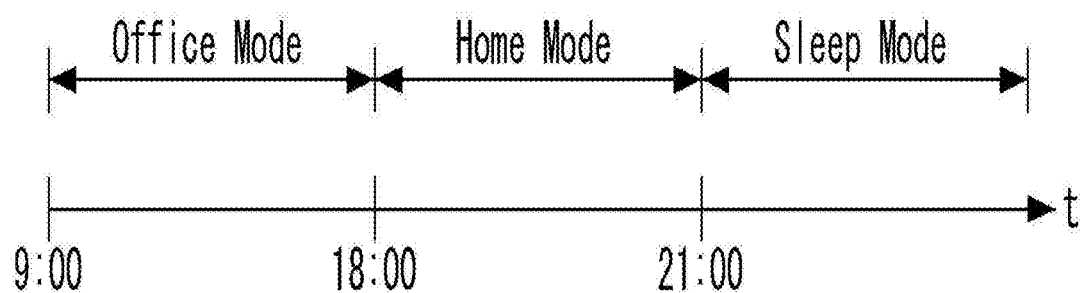

As shown in FIG. 29, the mobile terminal 100 according to an embodiment of the present invention may take tagged time into consideration when setting an operation mode.

If tagging is performed between 9 o'clock and 18 o'clock, the office mode may be activated. If tagging is performed between 18 o'clock and 21 o'clock, the home mode may be activated. If tagging is performed after 21 o'clock, the sleep mode may be activated.

It is common that a user is placed in a specific place in a specific time zone. Accordingly, a specific operation mode may be set based on time when tagging is performed.

Figure 30:
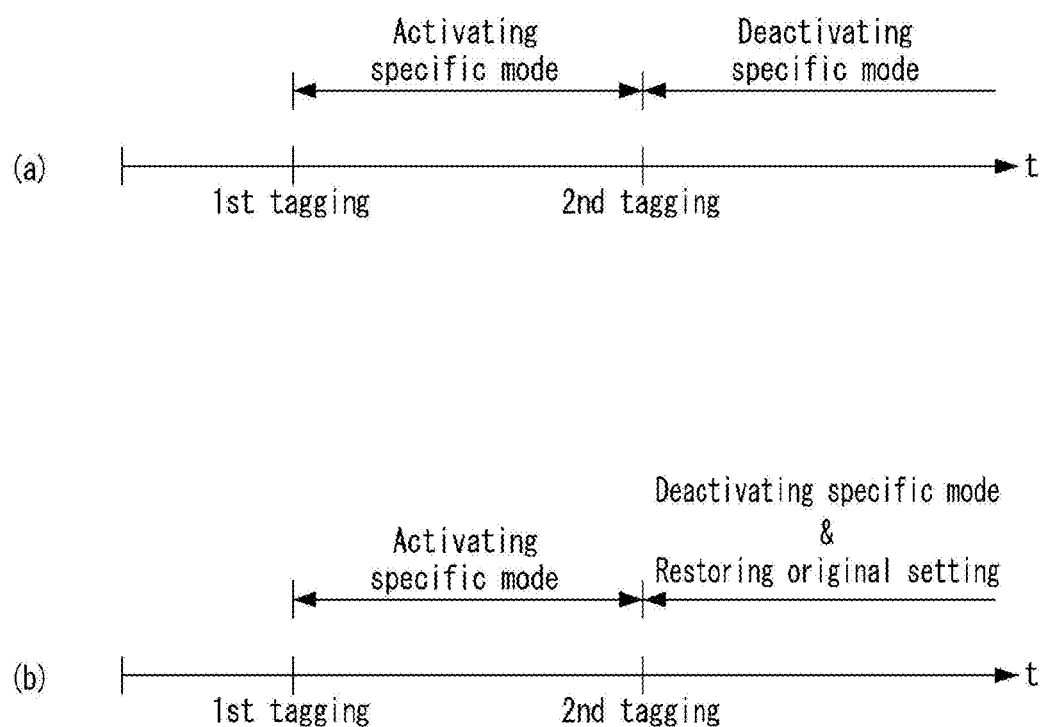

As shown in FIG. 30, the mobile terminal 100 according to an embodiment of the present invention may perform a specific operation on the basis of the number of times of taggings for a specific tag.

As shown in FIG. 30(a), the mobile terminal 100 may be primarily tagged to a specific tag. When the primary tagging is performed, a specific operation mode stored in the specific tag may be activated.

The mobile terminal 100 may be secondarily tagged to the specific tag that has been primarily tagged. When the secondary tagging is performed, the specific operation mode that has been activated may be deactivated by the secondary tagging.

As shown in FIG. 30(b), the mobile terminal 100 may be primarily tagged to a specific tag. When the primary tagging is performed, a specific operation mode stored in the specific tag may be activated.

The mobile terminal 100 may be secondarily tagged to the specific tag that has been primarily tagged. When the secondary tagging is performed, specific codes that have been activated may be deactivated by the secondary tagging. Furthermore, the original setting may be restored. That is, it means that the mobile terminal 100 may return to setting before the primary tagging. Accordingly, an increase of user convenience can be expected because a specific operation mode can be activated or deactivated by a tagging action and the mobile terminal may return to a setting value before tagging.

Figure 31:
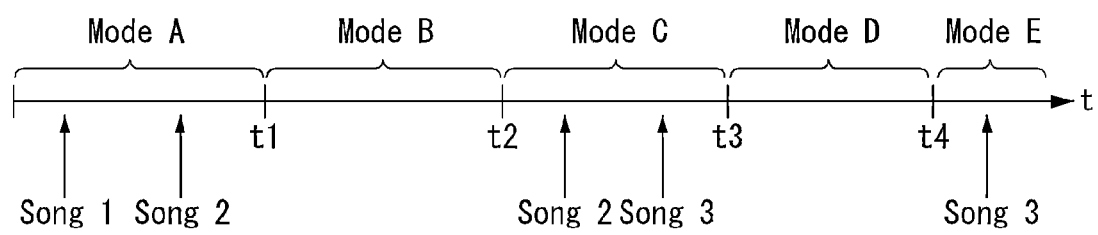
Figure 32:
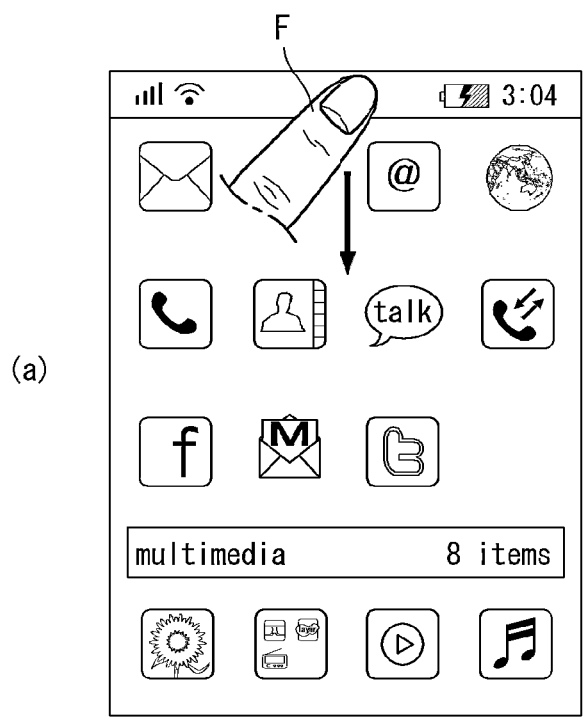
Figure 32:
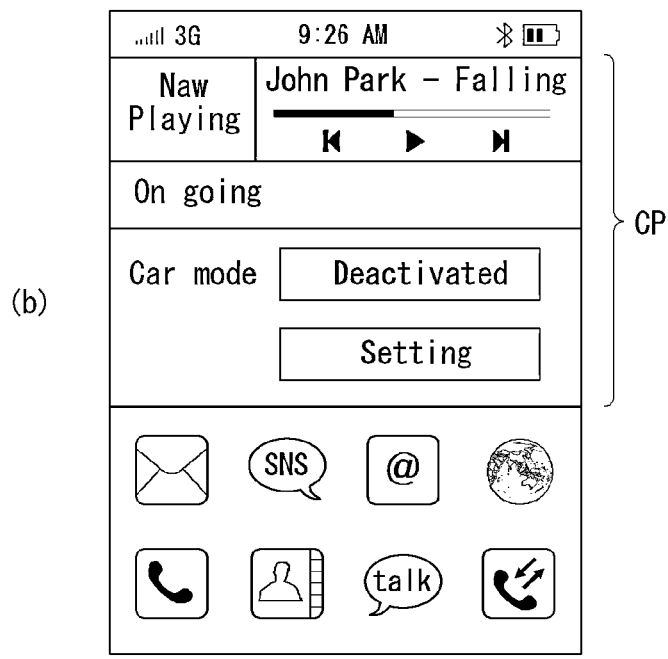

As shown in FIG. 31, when a specific operation mode is activated, the controller 180 may perform control so that a function that was performed in a relevant mode in the past continues to be performed. For example, music may be being played in a mode A. In the mode A, song 2 may be being played at a point of time t1. The mode A may be switched to a mode B at the point of time t1, and the mode B may be then switched to the mode A again at a point of time t2. When the mode B is switched to the mode A at the point of time t2, the controller 180 may continue to play the song 2 that was being played at the point of time t1. Song 3 may be being played at a point of time t3. The mode A may be switched to a mode C at the point of time t3, and the mode C may be then switched to the mode A again at a point of time t4. When the mode C is switched to the mode A at the point of time t4, the controller 180 may play the song 3 that was being played at the point of time t3. Accordingly, a user may use the mobile terminal 100 more conveniently because a function that was being played in a relevant mode continues to be executed when a specific operation mode is entered.

As shown in FIG. 32(a), a user may touch a status bar by using a finger F and then perform an action of dragging the status bar downwardly.

As shown in FIG. 32(b), when the action of dragging the status bar downwardly is inputted, the controller 180 may display a status window CP. Various pieces of information related to the operation of the mobile terminal 100 may be displayed in the status window CP. For example, information related to music now being played may be displayed in the status window CP. Information related to an operation mode now being activated may be displayed in the status window CP. A control button for deactivating an operation mode now being activated or a control button through which the setting of operation mode can be changed may be displayed in the status window CP. A user may select the control button and control the operation mode by using the control button.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Furthermore, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a Near Field Communication (NFC) module; and
a controller configured to:
set up a first NFC communication link via the NFC module with a NFC tag,
activate a first operation mode, based on a first point in time when the first communication link was formed,
execute a first function included in the activated first operation mode,
set up a second NFC communication link via the NFC module with the NFC tag,
activate a second operation mode, based on a second point in time when the second communication link was formed, and
execute a second function included in the activated second operation mode,
wherein the first point in time is different from the second point in time, and the first operation mode is different from the second operation mode, and
wherein when the first communication link with the mobile terminal is set up again when the first operation mode has been activated, the controller deactivates the activated first operation mode, changes a setting of the mobile terminal to a state before the activation of the first operation mode, and continues to execute a function that was performed in a relevant mode in the past,
wherein the controller is further configured to:
generate a setting value corresponding to a first operation mode in response to receiving an input of a set button; and
transmit the setting value and a unique number of the mobile terminal to a first terminal in response to receiving a tagging input of the first terminal such that the first terminal stores the setting value matching with the unique number.

2. The mobile terminal of claim 1, wherein the controller sets up another communication link with the first NFC tag by using the NFC module and transmits a setting value of the at least one function to be executed in the first operation mode to the first NFC tag through the other communication link.

3. The mobile terminal of claim 2, wherein the setting value includes information about an area where the first operation mode will be activated.

4. The mobile terminal of claim 1, wherein the NFC module comprises an NFC communication module.

5. The mobile terminal of claim 1, wherein the first communication link is set up by tagging to the first NFC tag and the second communication link is set up by tagging to the second NFC tag.

6. The mobile terminal of claim 1, wherein the first point in time falls within a first time period where the mobile terminal is set to be in the first operation mode, and the second point in time falls within a second time period where the mobile terminal is set to be in the second operation mode.

7. The mobile terminal of claim 1, wherein the NFC tag is carried along with the mobile terminal and not fixed at a geographical location.

8. The mobile terminal of claim 1, wherein the first function is deactivated during the second operation mode.

9. The mobile terminal of claim 8, wherein the controller is further configured to:
   set up a third NFC communication link via the NFC module with the NFC tag,
   activate a third operation mode, based on a third point in time when the third communication link was formed, and
   execute a third function in the activated third operation mode.

10. The mobile terminal of claim 9, wherein the third function includes reactivation of the deactivated first function in a state that the first function became deactivated.

11. A method of controlling a mobile terminal, comprising:
   setting up a first communication link via an Near Field Communication (NFC) module with a NFC tag;
   activating a first operation mode according to data included on the NFC tag obtained through the set-up first communication link, based on a first point in time when the first communication link was formed;
   executing at least one function included in the activated first operation mode;
   setting up a second NFC communication link via the NFC module with the NFC tag;
   activating a second operation mode according to data included on the NFC tag obtained through the second communication link, based on a second point in time when the second communication link was formed;
   executing at least one function included in the activated second operation mode, wherein the first point in time is different from the second point in time, and the first operation mode is different from the second operation mode;
   deactivating the activated first operation mode, when the first communication link with the mobile terminal is set up again when the first operation mode has been activated;
   returning a setting of the mobile terminal to a state before the activation of the first operation mode;
   continuously executing a function that was executed in a relevant mode in the past;
   generating a setting value corresponding to a first operation mode in response to receiving an input of a set button; and
   transmitting the setting value and a unique number of the mobile terminal to a first terminal in response to receiving a tagging input of the first terminal such that the first terminal stores the setting value matching with the unique number.

12. The method of claim 11, further comprising:
   setting up another communication link with the first terminal by using the NFC module, and
   transmitting a setting value of the at least one function to be executed in the first operation mode to the first terminal through the other communication link.

13. The method of claim 11, wherein the first point in time falls within a first time period where the mobile terminal is set to be in the first operation mode, and the second point in time falls within a second time period where the mobile terminal is set to be in the second operation mode.

14. The method of claim 11, wherein the NFC tag is carried along with the mobile terminal and not fixed at a geographical location.

15. The method of claim 11, wherein the first function is deactivated during the second operation mode.

16. The method of claim 15, further comprising:
   setting up a third NFC communication link via the NFC module with the NFC tag;
   activating a third operation mode, based on a third point in time when the third communication link was formed; and
   executing a third function in the activated third operation mode,
   wherein the third function includes reactivation of the deactivated first function in a state that the first function became deactivated.

* * * * *